United States Patent [19]

Kokubo et al.

[11] Patent Number: 4,589,708

[45] Date of Patent: May 20, 1986

[54] DEVICE FOR CARRYING BANK NOTES STACKED IN CONTAINER BOX ADAPTED FOR USE IN AUTOMATIC MONEY DEPOSITING AND DISBURSING MACHINE

[75] Inventors: Eiichi Kokubo; Koichi Goi; Junichi Arikawa; Hideyuki Ebihara; Hiroshi Chiba, all of Tokyo, Japan

[73] Assignee: Laurel Bank Machine Co., Ltd., Tokyo, Japan

[21] Appl. No.: 462,986

[22] Filed: Feb. 1, 1983

[30] Foreign Application Priority Data

Feb. 4, 1982 [JP] Japan .................................. 57-16597

[51] Int. Cl.[4] .................................................. B65G 1/16

[52] U.S. Cl. ......................................... 312/71; 312/312

[58] Field of Search ........................ 312/42, 50, 60, 61, 312/71, 312, 333; 221/279, 226–232

[56] References Cited

U.S. PATENT DOCUMENTS

| | | | |
|---|---|---|---|
| 1,667,988 | 5/1928 | Richardson | 221/279 |
| 1,821,350 | 9/1931 | Levy | 312/61 |
| 2,647,030 | 7/1953 | Fitz Patrick | 312/71 |
| 2,919,168 | 12/1959 | Shivek | 312/71 |
| 3,168,212 | 2/1965 | Edwards | 312/71 |
| 4,273,256 | 6/1981 | Wenner | 221/232 |

*Primary Examiner*—William E. Lyddane

*Assistant Examiner*—Joseph Falk

*Attorney, Agent, or Firm*—Fleit, Jacobson, Cohn & Price

[57] ABSTRACT

A device for carrying bank notes stacked in each of the container boxes to be inserted in an automatic money depositing and disbursing machine.

The device carries the bank note stack while controlling the upper surface thereof at a pre-set level to render the related money stacking or dispensing means to gain access to the bank notes, when the device is inserted in position in the automatic money depositing and disbursing machine. On the other hand, when each box is removed from the machine, stacked bank notes are securely held in the box while being compressed by the pressing plate. The device provided by the invention comprises a box for containing therein bank notes and having an upper opening through which bank notes are stacked and dispensed, a pressing plate for carrying thereon the bank notes contained in the box to move them in the upward and downward directions and mounted in the box, a link shaft mounted to the box to be moved inboard or outboard relative to the longitudinal axis of the box and operatively connected to the pressing plate to move the same in said upward and downward directions, and means for locking the link shaft to prevent it from moving when the link shaft is moved inward of the box.

8 Claims, 33 Drawing Figures

82
80c
82a
79
47A
63
63a
58a
59A
76
60
82c 46
46e
74a
74
74b
80b
85a
45
85
84
47A
49A
68
68a
69
58a
58b
63
80
80a
70
69a
76
79b
79
XII D
82
82c
79a
78b
71a
71
63a
71b
70a
82b
72
72a
76
78
78a
77c
59A
77a
77b
77
80b
83
80e
80
83
80c
82c
82
81
80b
80e
80
83a
80d
83
80a
82a
80c

DEVICE FOR CARRYING BANK NOTES STACKED IN CONTAINER BOX ADAPTED FOR USE IN AUTOMATIC MONEY DEPOSITING AND DISBURSING MACHINE

BACKGROUND OF THE INVENTION

The present invention relates generally to an automatic money depositing and disbursing machine, and particularly to a device for carrying therein bank notes stacked in a container box.

The height of the upper surface of the bank notes stacked or contained in the container or stacker boxes must be retained at an operable height to gain access by money depositing or dispensing means disposed above respective boxes, and the bank notes must be securely closed in respective container or stacker boxes when the boxes are carried by an operator separately from the automatic money depositing and disbursing machine.

SUMMARY OF THE INVENTION

The object of this invention is to provide a device for carrying thereon bank notes stacked in each container box and adapted to be assembled in an automatic money depositing and disbursing machine, which adjustably carries the bank notes to hold the upper surface of the uppermost note at a level to permit it to be dispensed from the box.

Another object of this invention is to provide a device of the aforementioned kind, by which the adjustment of the height of the upper surface of the bank note stack by the controlled upward and downward movements of the pressing plate is performed by the changeover operation of a link shaft mounted to each box between the inboard and outboard positions.

A further object of this invention is to provide a device of the aforementioned kind, by which the stacked bank notes are held securely in each container box while being compressed by the pressing plate which is locked in position.

A still further object of this invention is to provide a device of the aforementioned kind, in which the opening operation for opening the side cover and the operation of releasing the pressing plate are corelated with each other so as to facilitate easy discharge of the stacked bank notes from the container boxes.

Yet a further object of this invention is to provide a device of the aforementioned kind, in which the operation of connecting the link shaft to an external drive source and the operation of releasing the lock of the pressing plate are performed simultaneously by a single manipulation when each box is assembled in the machine body.

The device provided by the present invention comprises a box for containing therein bank notes and having an upper opening through which bank notes are stacked and dispensed, a pressing plate for carrying thereon the bank notes contained in the box to move them in the upward and downward directions, and mounted in said box to be biased by a spring normally towards said upper opening of the box, a link shaft mounted to the box to be moved inboard or outboard relative to the longitudinal axis of the box and operatively connected to the pressing plate to move the same in said upward and downard directions, and means for locking the link shaft to prevent the pressing plate from moving when the link shaft is moved inward of the box.

Other objects and advantages of the present invention will become apparent from the following detailed description of the invention.

DESCRIPTION OF THE DRAWINGS

The present invention will now be described in detail with reference to the presently preferred embodiment illustrated in the accompanying drawings in which.

DESCRIPTION OF THE PREFERRED EMBODIMENTS

The present invention will now be described in detail by referring to the embodiment shown in the accompanying drawings.

Figure 1:
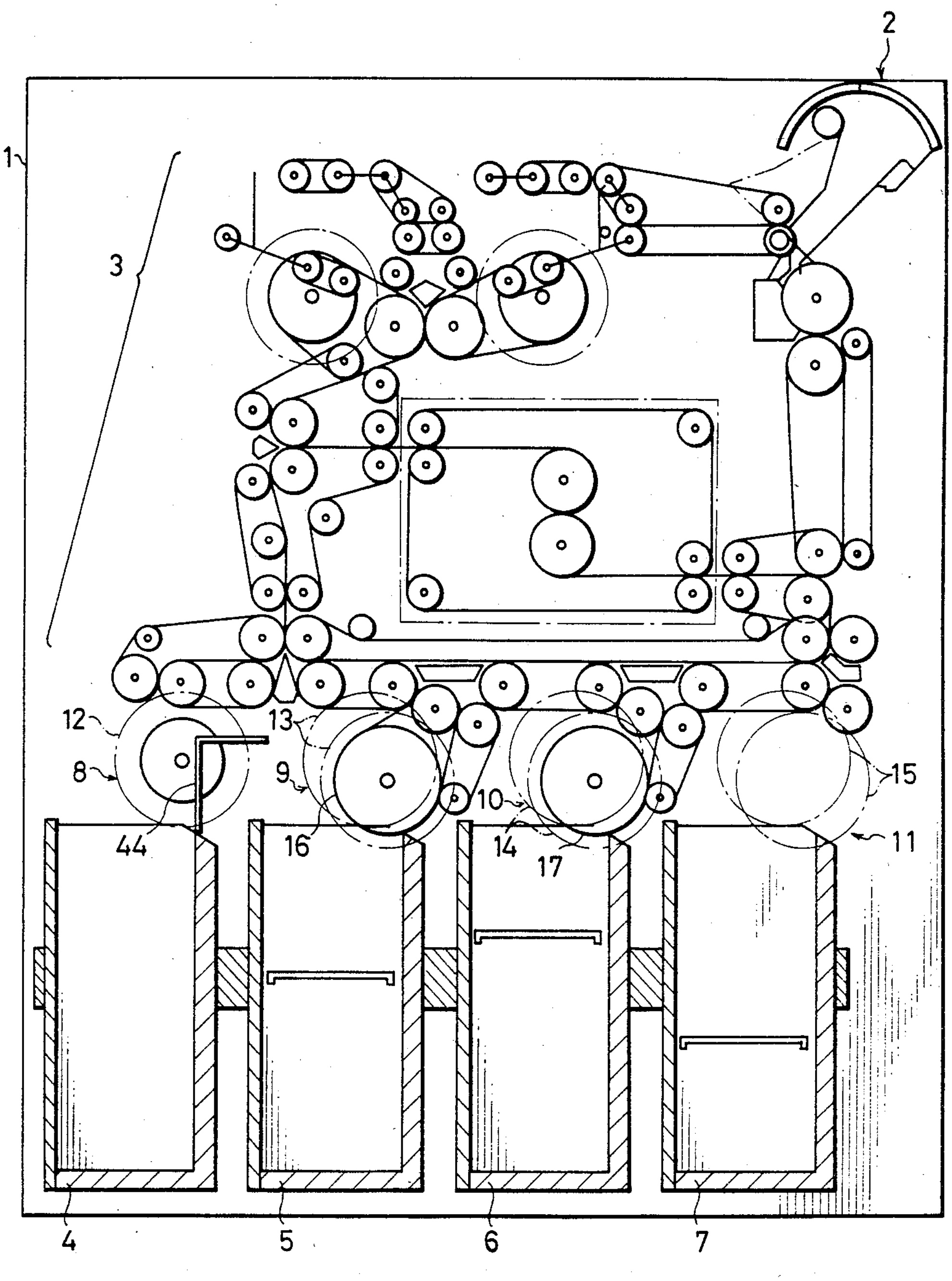
FIG. 1 is a diagrammatical side view showing the structure of one embodiment of an automatic money depositing and disbursing machine according to the present invention.
Figure 2:
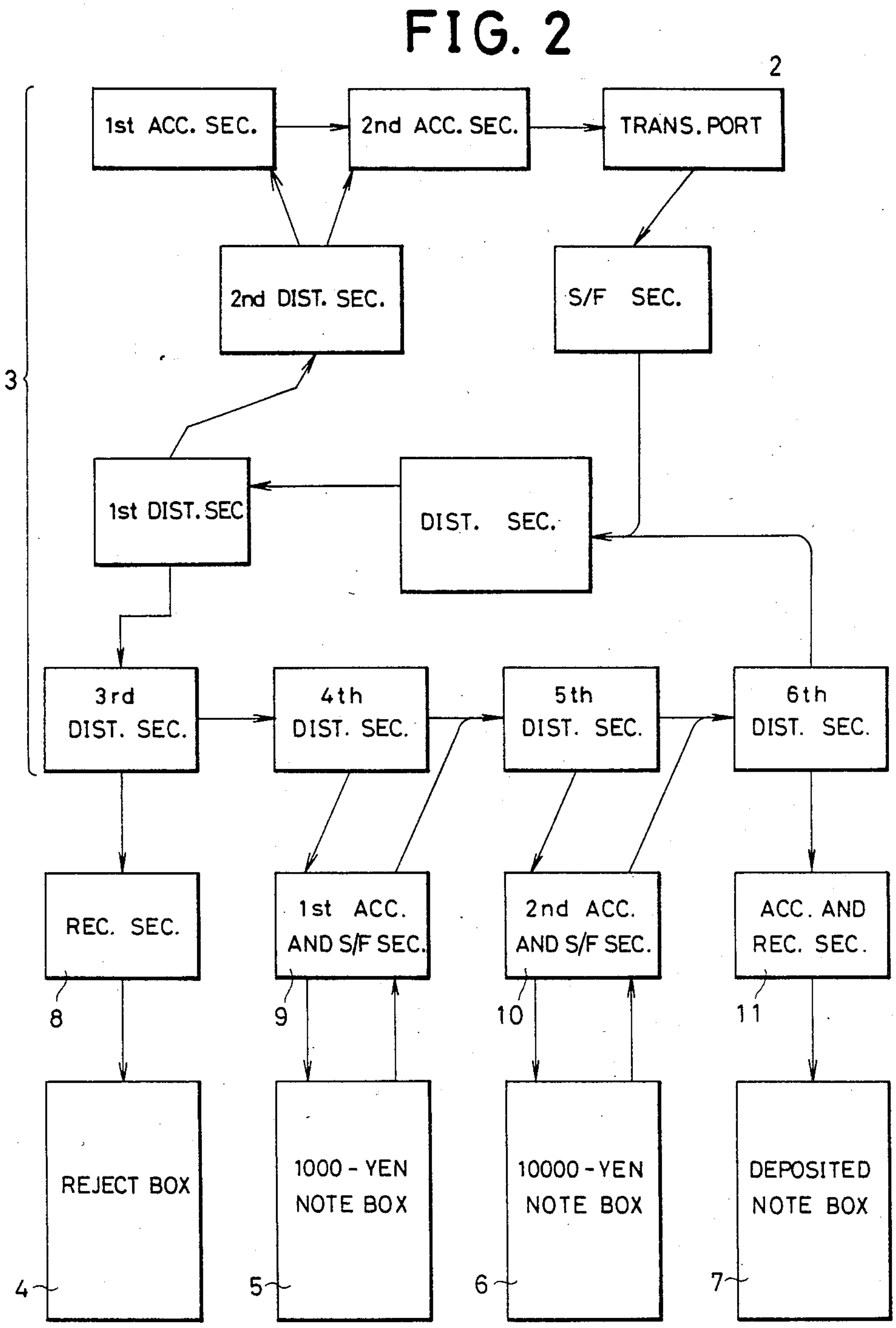
FIG. 2 is a block diagram showing the flow of bank notes circulated through respective sections shown in FIG. 1.

FIG. 1 is a diagrammatical side view showing the structure of one embodiment of the automatic money depositing and disbursing machine to which the present invention is applied, and FIG. 2 is a block diagram showing the flow of bank notes through respective structural elements.

In the automatic money depositing and disbursing machine of this embodiment, the money depositing mode operation and the money disbursing mode operation are performed by customers through a transacting port 2 arranged on one side of a machine body 1 (transaction ports may be arranged on both sides of the machine body 1), and while these notes are circulated and delivered through a note circulating delivery passage 3, note boxes 4 to 7 located in the lower portion of the machine body are mutually connected to the transacting port 2 through the note circulating delivery passage 3.

Various means are disposed in the machine to perform the respective functions described above. In this embodiment, the note boxes 4 to 7 are connected to the note circulating delivery passage 3 through note transfer mechanisms 8 to 11 arranged above the note boxes 4 to 7. More particularly, the reject box 4 is connected through the note receiving section 8 to the note circulating delivery passage 3, and similarly the 1000-Yen note box 5 is connected through the first accumulating and separating feed section 9, the 10000-Yen note box 6 is connected through the second accumulating and separating feed section 10 and the deposited note box 7 is connected through the accumulating and receiving section 11 to the note circulating delivery passage 3.

An accumulating wheel 12 is arranged in the note receiving section 8 to receive notes from the note circulating delivery passage 3 and let them fall down into the reject box 4. The accumulating wheel 12 is positioned at approximately the same level as the upper retracted position of swingable accumulating wheels 13 to 15 which will be described in detail hereinafter. The accumulating wheels 13 to 15 are arranged, respectively, in the first and second accumulating and separating feed sections 9 and 10 and the accumulating and receiving section 11 to receive notes from the note circulating delivery passage 3, and to accumulate and stack the notes in respective boxes 5 to 7. The accumulating wheels 13 to 15 are swung from a lower accumulating position for accumulating a stack of notes to an upper retracted position at the initial stage of operation and at a time for separately feeding the notes.

Suction drums 16 and 17 are arranged in the first and second accumulating and separating feed sections 9 and 10, respectively, to suck the notes accumulated and stacked in the corresponding boxes 5 and 6 one by one to pull them out of the boxes. The suction drums 16 and 17 are adapted to engage with the notes when the aforementioned accumulating wheels 13 and 14 are swung upwards to the upper retracted positions.

The constructions and operations of the first and second accumulating and separating feed sections 9 and 10 will now be described with reference to FIGS. 3 to 8. Since the construction and operation of the section 10 are the same as those of the section 9, only the description of the first accumulating and separating feed section 9 will be given below.

Figure 3:
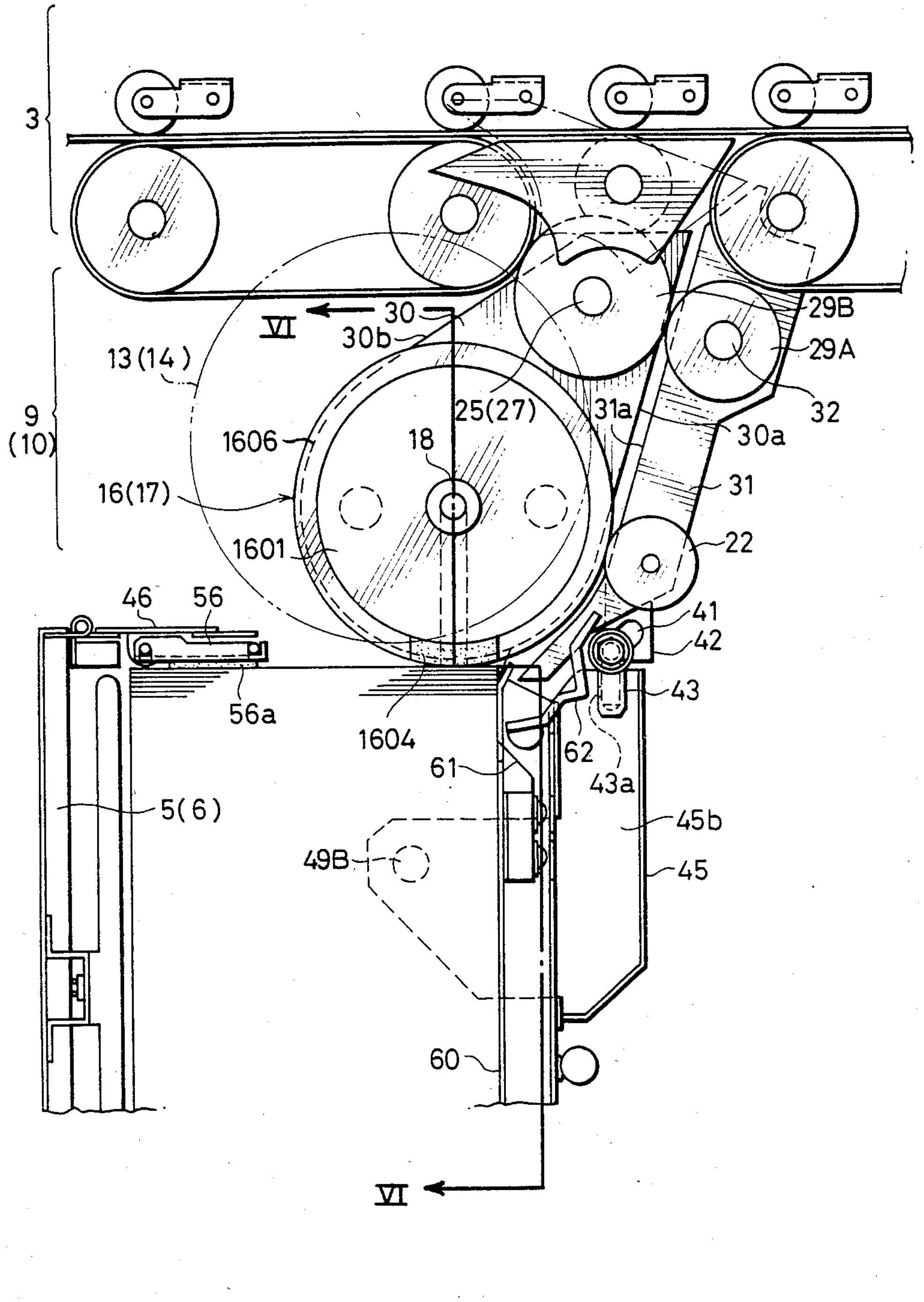
FIG. 3 is a cross-sectional view taken along line III—III of FIG. 6, showing the structure and operation of the first accumulating and separating feed section.

At the position shown in FIG. 3, the accumulating wheel 13 (which is shown simply by the orbit of the fore ends of the paddles of the wheel in this Figure) is swung to the upper retracted position and the bank notes are separately sucked by the suction drum 16 one by one.

Figure 4:
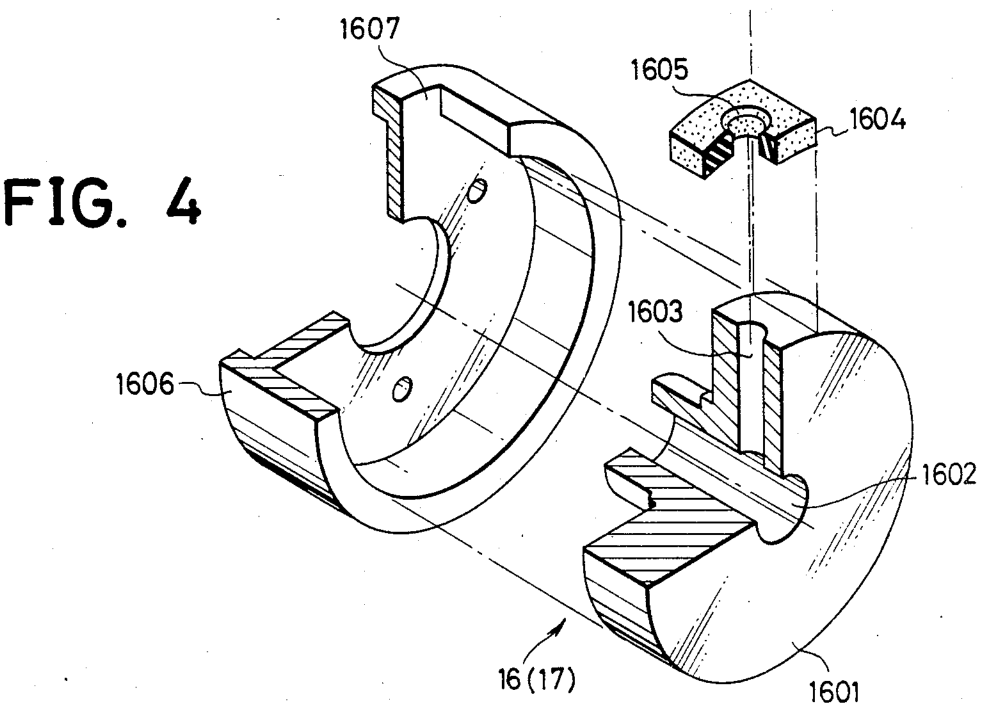
FIG. 4 is a perspective view showing the suction drum in the exploded condition.

Referring to FIG. 4, which is a perspective view showing the suction drum 16 in the exploded condition, the suction drum 16 comprises a cylindrical inner drum 1601 having a center hollow portion 1602 through which a rotary suction axle 18 (see FIG. 3) is inserted and further having a suction hole 1603 communicating with the center hollow portion 1602 and extending radially therefrom. A frictional sucker piece 1604 made of a rubber or like frictional material, formed with a through-hole 1605, is adapted to be aligned with the suction hole 1602 of the inner drum 1601. An outer drum 1606 is provided having a portion cut away to form a notch 1607 and having the center portion bored to form hollow cavity in which the inner drum 1601 is inserted. The frictional sucker piece 1604 is fixedly secured to the inner drum 1601 so that the through-hole 1605 is substantially aligned with the suction hole 1603, and then the inner drum 1601 is inserted into the outer drum 1606 to be fixedly secured to the latter so that the outer peripheral wall of the inner drum 1601, other than the portion on which the frictional sucker piece 1604 is secured, is covered by the outer drum 1616, whereby the suction drum 16 having an outer peripheral wall of cylindrical contour is assembled.

Figure 5:
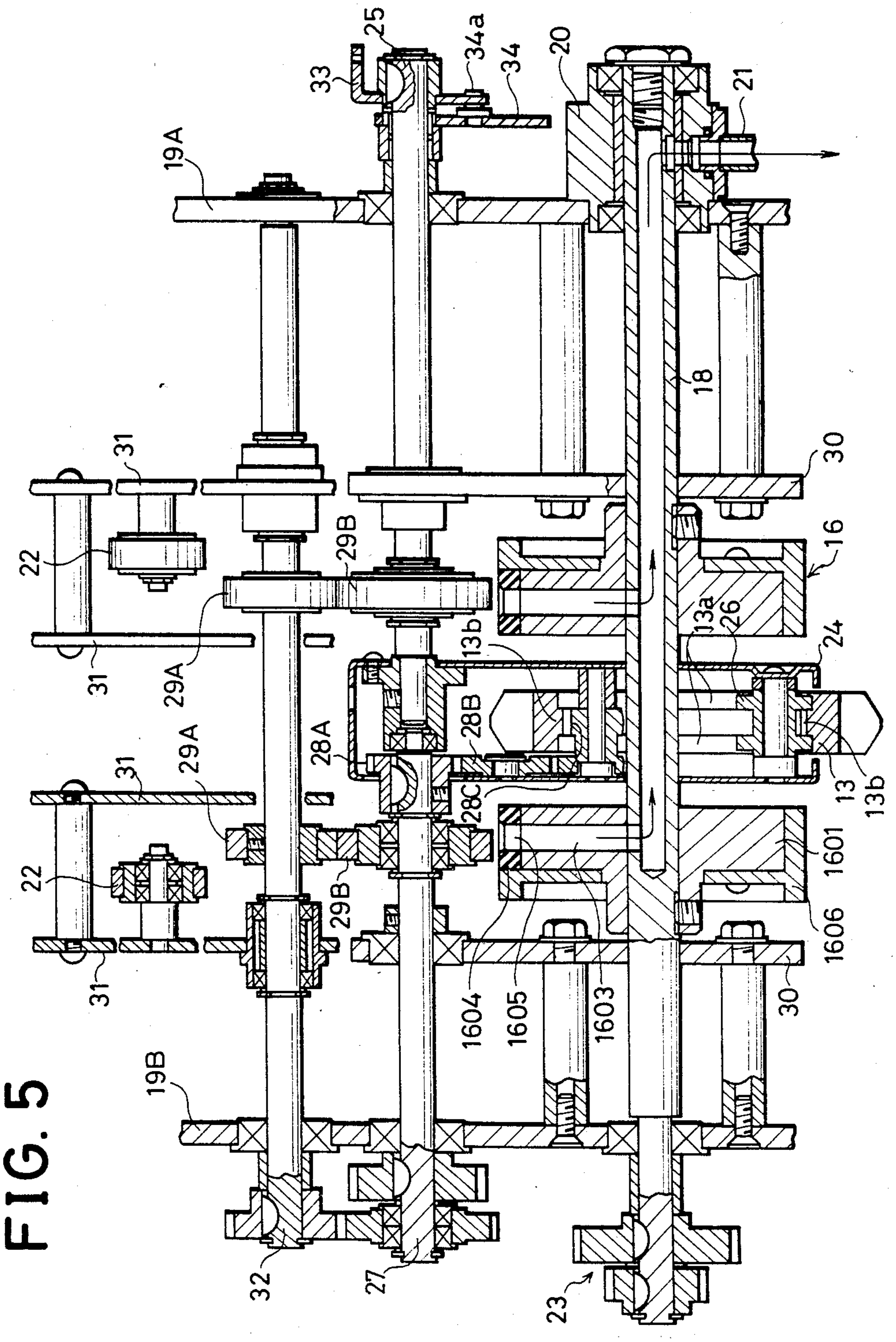
FIG. 5 is a cross sectional view taken along line V—V of FIG. 7, showing the first accumulating and separating feed section.
Figure 6:
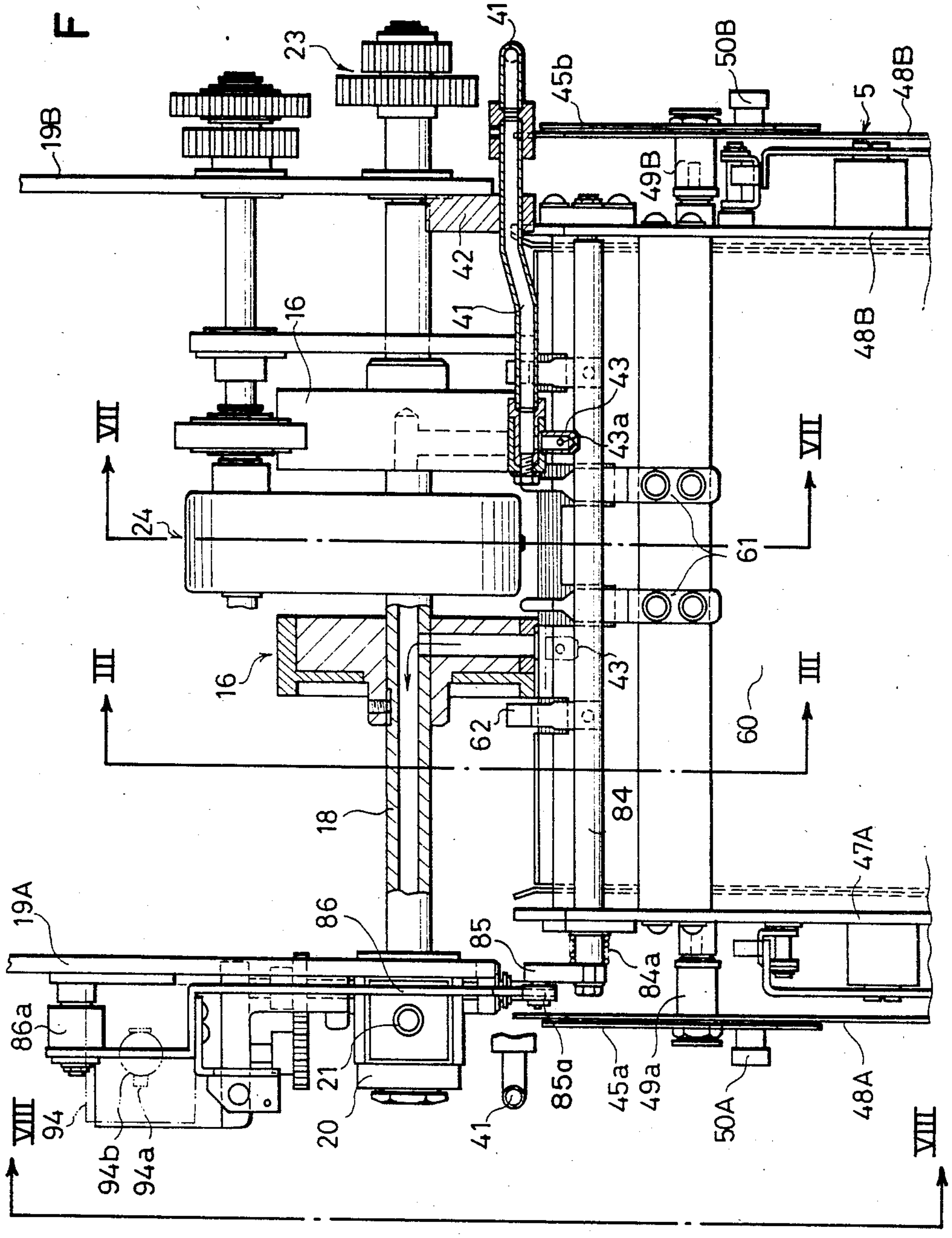
FIG. 6 is a cross-sectional view taken along line VI-VII of FIG. 3, showing the first accumulating and separating feed section.

FIG. 5 shows a section of the first accumulating and separating feed section 9 taken along a horizontal plane, and FIG. 6 is a front view of the first accumulating and separating feed section 9 and related parts when viewed from the right-hand side in FIG. 3.

Two suction drums 16 each having the construction as described hereinabove are mounted on the rotary suction shaft 18 formed with a suction conduit extending along the center axis thereof. The rotary suction shaft 18 is rotatably carried by a joint 20 having one end fixed to a frame inner side plate 19A, and a vacuum pipe 21 communicating with a vacuum pump (not shown) is connected to the joint 20 to develop the sucking vacuum pressure through the frictional sucker piece 1604. The end of the rotary suction shaft 18 contained in the joint 20 is formed with a hollow communication segment subtending a pre-set angle so that the sucking vacuum pressure is developed through the route as shown by the arrow in FIG. 6 during the time period while the suction drums 16 suck bank notes and deliver the same to the clamping rollers 22 (see FIG. 3). A gear 23 is fixedly mounted on the other end of the rotary suction shaft 18. The shaft 18 is rotated by a delivery motor, not shown, so that the circumferential speed of the suction drums is equal to the conveying speed of the note circulating delivery passage 3.

As shown in FIGS. 5 and 6, an accumulating wheel 13 is interposed between the two suction drums 16 and swingably supported by an accumulating wheel support frame 24. The structure and operation of the accumulating wheel support frame 24 will now be described with reference to FIGS. 5 and 7.

Figure 7:
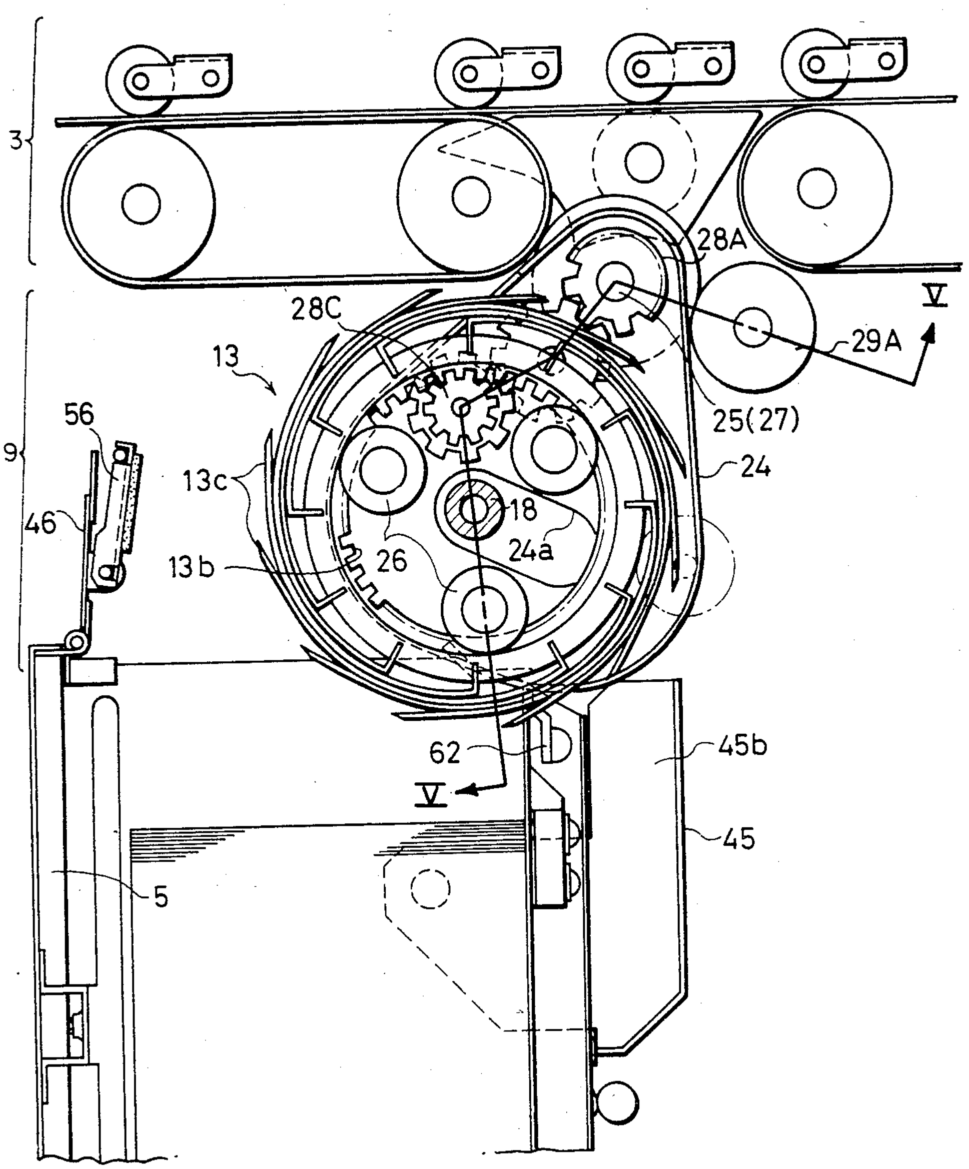
FIG. 7 is a cross-sectional view taken along line VII—VII of FIG. 3, showing the first accumulating and separating feed section.

Referring to FIG. 7, the accumulating wheel 13 is set to the lower accumulating position to be operated for accumulating and stacking the bank notes. The accumulating wheel support frame 24 is integrally attached to an accumulating wheel oscillating shaft 25 which is rotated reciprocally by an oscillating motor, not shown, and three accumulating wheel guides 26 are rotatably supported on the accumulating wheel support frame 24. The inner circumferential face 13*a* of the accumulating wheel 13 is brought in contact with the guides 26 so that the accumulating wheel 13 is supported by the guides 26. A center part of the inner circumferential face 13*a* of the accumulating wheel 13 is formed into an internal gear 13*b* projecting inward. A rotating force is given to this internal gear 13*b* from a gear driving shaft 27 which is coaxial with the accumulating wheel oscillating shaft 25 and is rotatable relative to the accumulating wheel support frame 24, through gears 28A, 28B and 28C. An elongated opening 24*a* is formed on the accumulating wheel support frame 24 to extend along the oscillation direction thereof and a rotary suction shaft 18 intersecting the oscillation plane at a right angle is inserted in this elongated opening 24*a*.

As shown in FIG. 3, bank note guides 30 are attached to the frame inner side plates 19A and 19B adjacent to the outer sides of both suction drums 16. Each bank note guide 30 includes a guide face 30*a* for assisting the smooth delivery of the bnank note sucked by the suction drums 16 and then clamped by the clamping rollers 22 to be passed to the conveyor rollers 29A and 29B for feeding the note to the note circulating delivery passage 3 during the operation of sucking and separating the bank notes, and a guide face 30*b* for inserting each of the bank notes fed from the note circulating delivery passage 3 beneath each of the paddles 13*c* of the accumulating wheel 13 during the operation of accumulating and stacking the bank notes. A further bank note guide 31 having a guide face 31*a* facing to the guide face 30*a* of the bank note guide 30 is swingably carried by the rotary shaft 32 of the conveyer rollers 29A, and the aforementioned clamping rollers 22 are rotatably carried by the lower end of the bank note guide 31. The bank note guide 31 is swingably biased by a spring, not shown, so that the suction drums 16 abut against the clamping rollers 22. The other conveyer rollers 29B are rotatably carried by the accumulating wheel oscillating shaft 25 and the gear driving shaft 27, and are driven by the conveyor rollers 29A.

Now referring to FIG. 8, the swinging mechanism for swinging the accumulating wheel 13 between the upper retracted position and the lower accumulating position will be described.

A stopper 33 is fixedly mounted on the end of the accumulating wheel oscillating shaft 25 that is swingably carried by the frame inner side plate 19A with an end projecting outside of the side plate 19A, and a swinging lug 34 is swingably carried by the shaft 25. A spring 33*a* is connected to the stopper 33 so that the accumulating wheel 13 is swingably biased to the lower accumulating position. The stopper 33 is formed with a stopping face 33*b* which is engaged with a pin 34*a* fixed substantially at the center of the swinging lug 34 to limit the swinging movement of the stopper 33.

On the other hand, a swing cam 36 formed with a cam recess 36*a* is fixedly mounted on an output shaft 35 of a swing motor (not shown). A guide roller 37*b* carried by one end of a first swing arm 37, which in turn is carried by a shaft 37*a*, is housed in the cam recess 36*a*. The other end of the first swing arm 37 is formed with an elongated slot 37*c* into which is inserted a pin 38*b* fixed to one end of a second swing arm 38. The second swing arm 38 is carried by a shaft 38*a*. The second swing arm 38 has a pin 38*c* at the other end thereof, and the pin 38*c* is linked with the pin 34*b* fixed to the swing end of the swinging lug 34 through a link bar 39.

Two notches 36*b* and 36*c* are formed on the outer peripheral edge of the swing cam 36 at positions symmetrical about the output shaft 35. The notches are formed on the opposed sides of the cam 36. Two microswitches 40A and 40B are disposed adjacent to the corresponding notches 36*b* and 36*c* so that the accumulating wheel 13 is moved to the upper retracted position when the microswitch 40A is switched on by the notch 36*b* and the accumulating wheel 13 is moved to the lower accumulating position when the microswitch 40B is switched on by the notch 36*c*.

Figure 8:
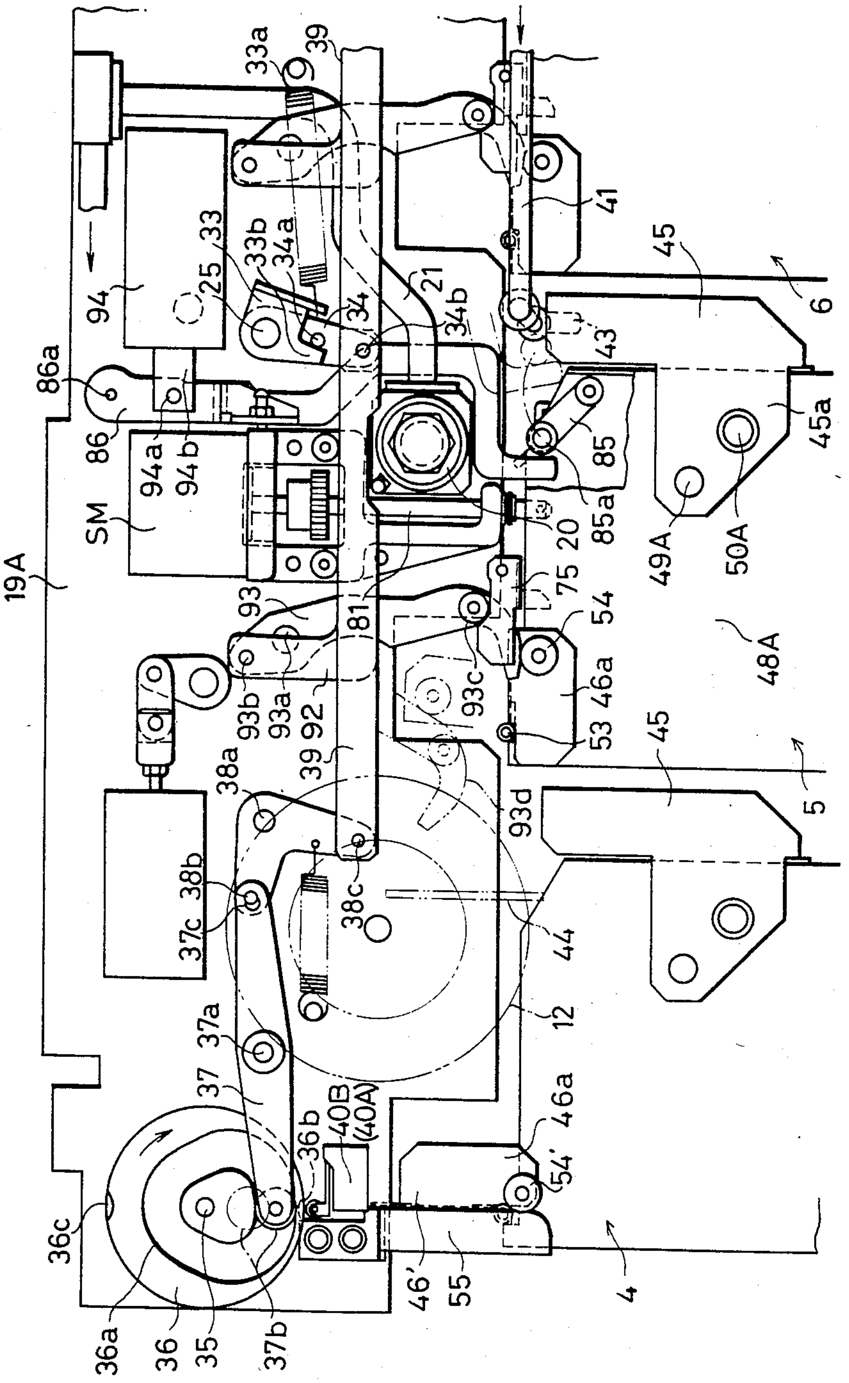
FIG. 8 is a side elevational view, looking in the direction of arrows VIII—VIII of FIG. 6, showing the parts contained in the side plates of the machine frame, in which the mechanism for swinging or oscillating the accumulating wheels is depicted.

Therefore, at the position shown in FIG. 8, the microswitch 40A is switched on by the engagement in the notch 36*b* of the swing cam 36 and the pin 34*a* of the swinging lug 34 abuts against the stopping face 33*b* of the stopper 33 to forcibly swing the stopper 33 in the counterclockwise direction against the action of the spring 33*a*, so that the accumulating wheel 13 is moved to the upper retracted position as shown in FIG. 3. On the other hand, when the swing motor is operated to rotate the swing cam 36 in the clockwise direction as viewed in the Figures by about a half revolution, the microswitch 40B is switched on by the action of the notch 36*c* of the cam 36, whereupon the stopper 33 swings in the counter-clockwise direction as viewed in the Figures while normally abutting against the pin 34*a* of the swinging lug 34 to be moved therewith so that the accumulating wheel 13 is moved to the lower accumulating position as shown in FIG. 7.

As will be understood from the foregoing, the accumulating wheels are forcibly swung upward to the upper retracted positions by the forcible swinging action of the swinging mechanisms, whereas the accumulating wheels 13 to 15 are independently moved downward when each of the accumulating wheels are swung to the lower accumulating position. With this construction, in the automatic money depositing and disbursing machine according to this invention, the bank notes suited for reuse are selectively stacked in respective note boxes 5 and 6 ready to be disbursed again and the other of the received bank notes are stacked in the reject box 7. When either one or both of the note boxes 5 and 6 have been filled or packed with the bank notes at their full capacities, the subsequent bank notes are led to the reject box 7 rather than being pushed in the note box 5 and/or 6. More particularly, if either one or both of the note boxes 5 and 6 has been packed with bank notes at its full capacity and there is no space for receiving additional bank notes, in other words, when either one or two of the accumulating wheels cannot been moved to the lower accumulating position, the subsequent bank notes can be deposited in the other note box 6 or 5, or the reject box 7, whichever has space for receiving the bank notes. Meanwhile, prior to the swinging operation for moving the accumulating wheels 13 to 15 to the lower accumulating positions, a motor SM is driven to move the accumulated bank note stacks contained in the respective boxes downward to provide spaces for receiving the bank notes. The details of the motor SM will be described hereinafter.

In a more preferable embodiment, air is blown onto the side edge of the upper portion of the bank note stack during the operation of sucking separately the uppermost note by the aforementioned suction drums 16, in order to facilitate the sucking and separating operation. In detail, as shown in FIGS. 3, 6 and 8, an air duct 41 communicating with an air-blow pump (not shown) extends adjacent to each suction drum 16 while supported by a block 42 secured to the frame interior side plates 19A and 19B, and an air-blow nozzle 43 provided with an air-blow hole 43*a* is attached to the fore end of the air duct 41 so that the air blown from the air-blow hole 43*a* of the air-blow nozzle 43 is blown onto the upper portion of the bank note stack in the vicinity of the uppermost note sucked by the suction drums 16. An air-blow arrangement as aforementioned is associated with each of the two suction drums 16.

The first and second accumulating and separating feed sections 9 and 10 have the construction as described hereinabove.

As has been mentioned hereinbefore, the accumulating wheel 12 (which may be of the same construction as that of a conventional accumulating wheel) is rotatably mounted in the receiving section 8 at a vertical level substantially the same as that of the upper retracted position of the accumulating wheel 13, and has a scraper plate 44 for scraping the bank notes inserted beneath the paddles of the accumulating wheel 12 out of the wheel.

The construction of the accumulating and receiving section 11 is similar to the aforementioned construction of the first and second accumulating and separating feed sections 9 and 10, except in that the parts required for the sucking and separating operation, for instance the suction drums 16 or 17 and the air-blow nozzles 43, may be dispensed with since the bank notes accumulated and stacked in the reject box 7 are not necessarily sucked and separated. However, in place of the suction drums, rollers for guiding the bank notes during the accumulating and stacking operation may be arranged.

The construction of each of the boxes 4 to 7 will now be described by referring to the 1000-Yen note box 5.

Figure 9A:
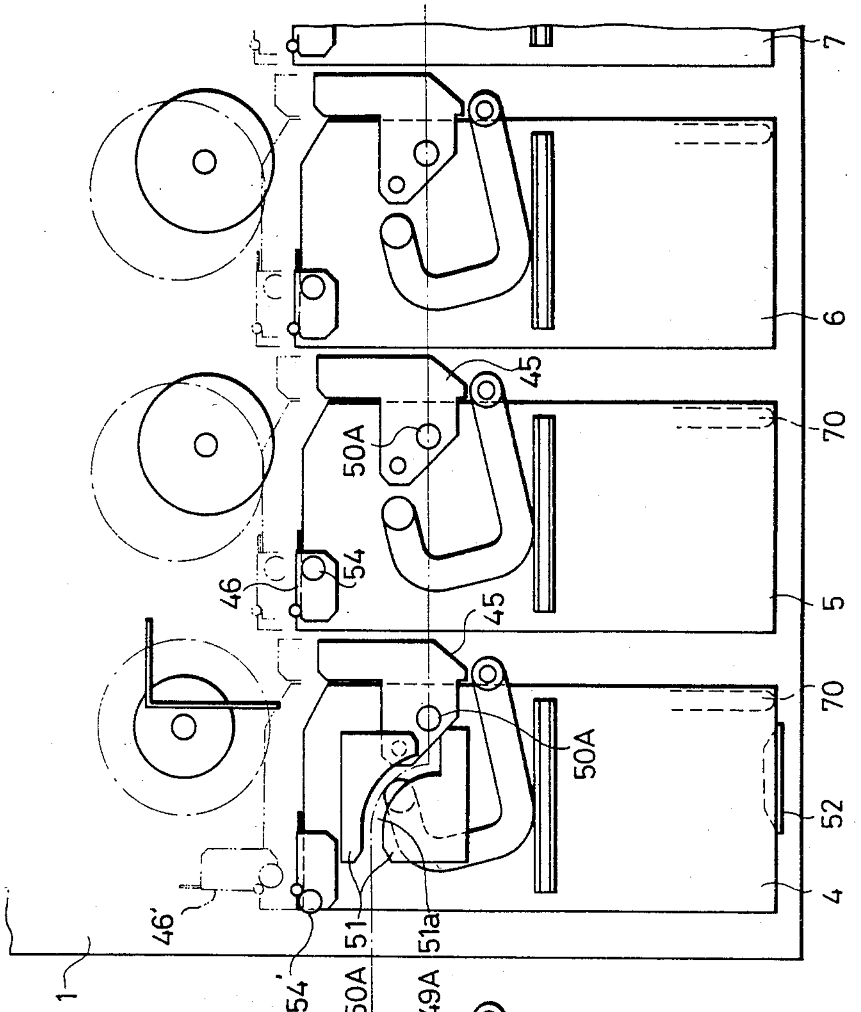
FIGS. 9(A) and 9(B) are schematic views showing the operation for assembling or disassembling the note boxes with or from the machine frame.
Figure 9B:
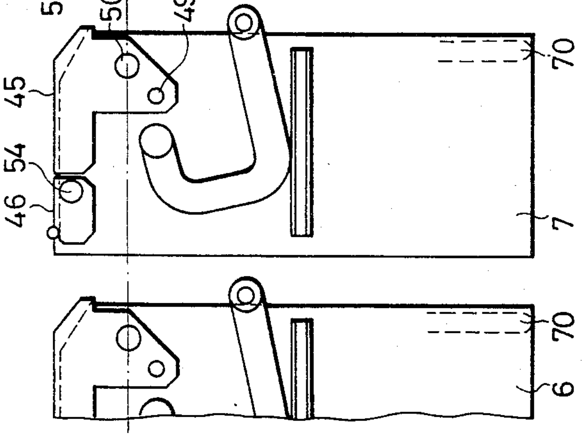

The top opening, namely the upper opening when the box is assembled in the machine body 1, of the 1000-Yen note box (hereinafter referred to simply as a box) 5 is opened or closed by a swingable front cover 45 and a swingable push cover 46, as shown in FIG. 8. The front cover 45 is mounted on the ends of stubs 49A and 49B rotatably carried by box interior plates 47A, 47B and box exterior plates 48A, 48B (see FIG. 6). The front cover 45 has side plate portions 45*a* and 45*b* on which guide rollers 50A and 50B are mounted at positions eccentric to the stubs 49A and 49B. The guide rollers 50A and 50B are guided along opening and closing grooves 51*a* (see FIG. 9A) of an opening and closing cam 51 disposed at the both sides of the machine body 1 so that the front cover 45 is opened by means of the opening and closing cam 51 as shown in FIG. 9(A) when the box 5 is inserted inward of the machine body 1, and the front cover 51 is closed by means of the opening and closing cam 51 as shown in FIG. 9(B) when the box 5 is removed from the machine body 1. As will be described hereinafter, a lock for controlling the opening and closing of the front cover 45 is unlocked by an unlock cam 52 disposed at the lower end of the machine body 1 when the box is inserted into or pulled out of the machine body 1. Each of the boxes 4 to 7 which is inserted within the machine body 1 to take the position shown by solid lines in FIG. 9A is moved upward by one step to take the position shown by the dot-and-dash lines to be ready for operation of the automatic money depositing and disbursing machine.

On the other hand, the push cover 46 is pivoted to the frame of the box 5 by 2 hinge 53, and has side plate portions 46*a* and 46*b* on which guide rollers 54 are mounted at the positions close to the front cover 45, although only one guide roller mounted on the side plate portion 46*a* is shown in the Figure. The push cover 46 is normally biased by a spring, not shown, to swing in the opening direction, and is provided with a push cover lock for restricting the opening of the push cover 46, as will be described hereinafter. The push cover 46 is normally closed during the operations of assembling and disassembling the box 5 (see FIGS. 9(A) and 9(B)) and also during the operation of sucking and separating the bank notes (see FIG. 3), and the push cover lock is released to open the push cover 46 only during the operation of accumulating and stacking the notes (see FIG. 7).

However, with regard to the reject box 4 into which bank notes are thrown to be stacked, the push cover 46' is normally biased by a spring to swing to the closing direction, and guide rollers 54' are mounted on the side plates 46*a'* at the positions remote from the front cover 45. When the box 4 is moved upward to the level shown by the dot-and-dash lines in FIG. 9(A), the guide rollers 54' of the push cover 46' abut against the opening cams 55 fixed to the frame inner side plates 19A and 19B to restrict their further upward movements, whereupon the push cover 46' is pivoted upwards about the hinge 53 to be set to the opened condition.

The construction of the box 5 will be described in detail with reference to FIGS. 10 to 13.

Figure 10:
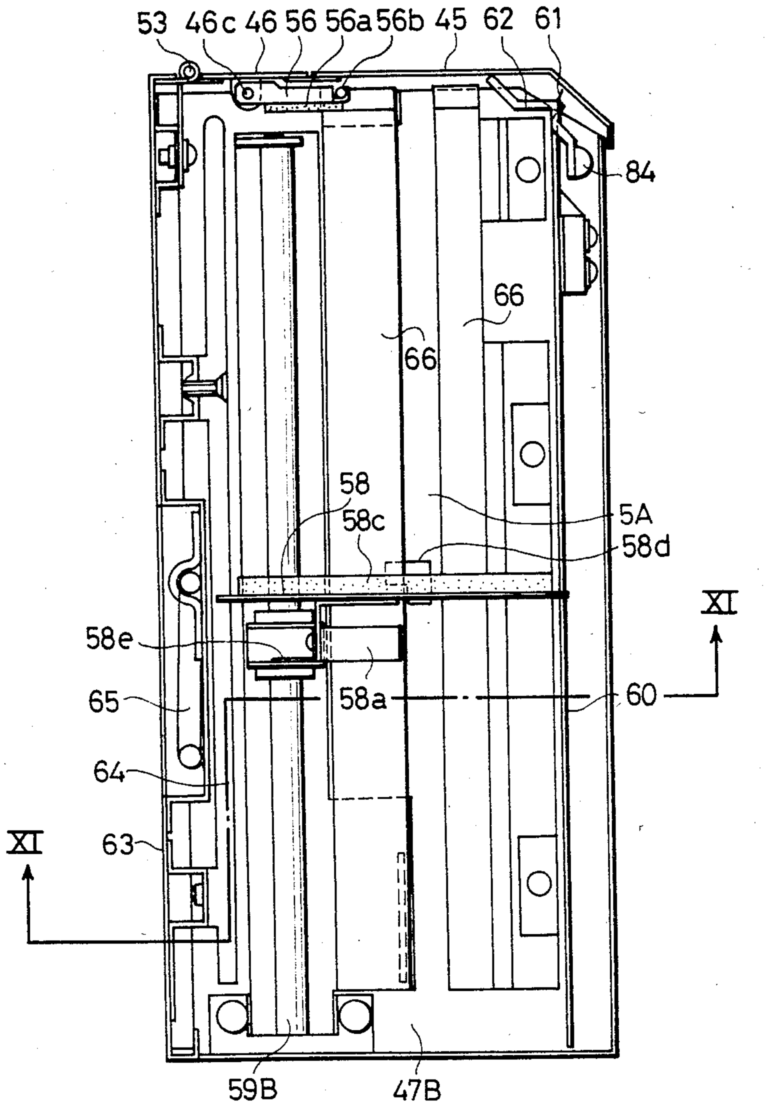
FIG. 10 is a cross-sectional view taken along line X—X of FIG. 11, showing the center portion of the note box.
Figure 11:
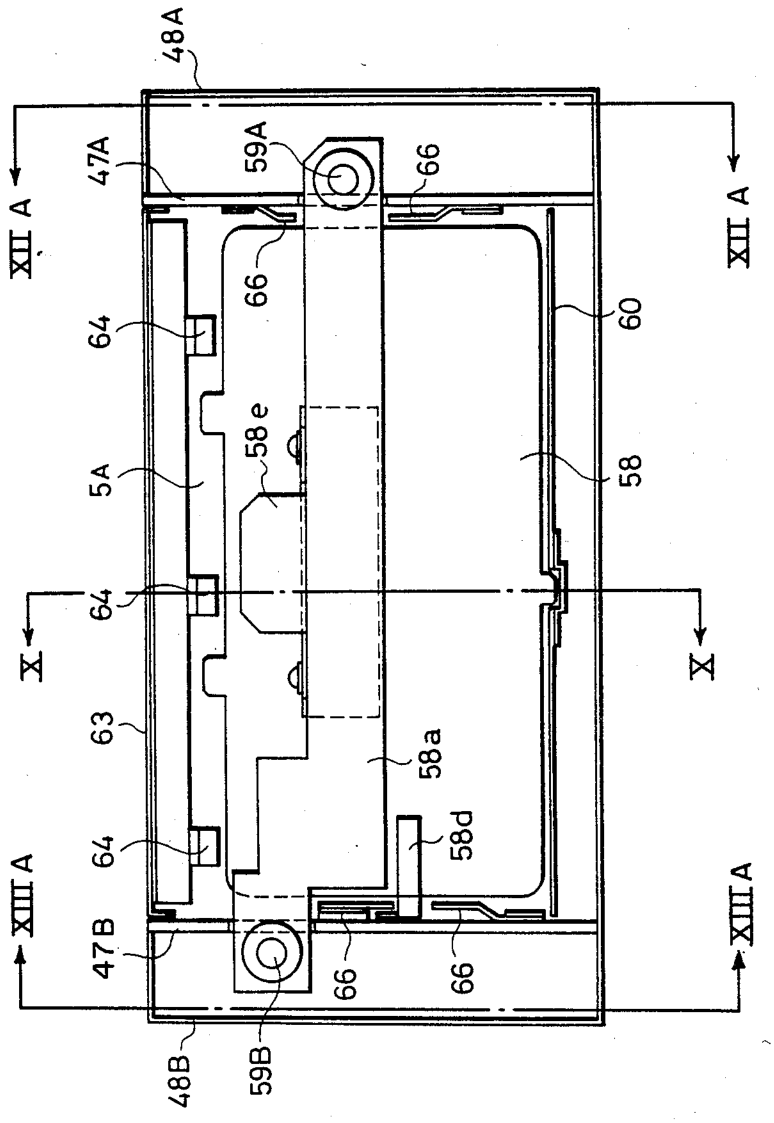
FIG. 11 is a cross-sectional view taken along line XI—XI of FIG. 10, showing the rear portion of the note box.

FIG. 10 is a sectional view of the box 5 taken along the center thereof, and FIG. 11 is a sectional view of the rear portion of the box 5 when viewed from the left-hand side in FIG. 10. FIGS. 12(A), 12(B), 12(C), 12(D) and 12(E) are schematic illustrations showing the structure and operation of a mechanism combined with the box interior side plate 47*a*. FIGS. 13(A), 13(B), 13(C) and 13(D) are schematic illustrations showing the structure and operation of a mechanism combined with the box interior side plate 47B. In these Figures, the top opening (in FIGS. 10, 12, and 13, the opening is shown at the top of the drawings) of the box 5 is shown as closed by the front cover 45 and by the push cover 46.

Referring firstly to FIGS. 10 and 11, disposed at the inside face of the push cover 46 is an operation plate 56 swingably carried by a shaft 46*c* supported by the inside face of the push cover 46. A frictional member 56*a* for engaging with the bank notes accumulated and stacked in the box is attached to the inside face of the operation plate 56, and an operation pin 56*b* for operating an upper surface sensor operating plate 57 is mounted on the swinging fore end of the operation plate 56. Details of the upper surface sensor operating sensor 57 will be described hereinafter. The operation plate 56 is biased to swing to the direction for pressing the bank notes accumulated and stacked in the box, namely in the direction toward the inside face, by a spring, not shown. On the other hand, the operation pin 56*b* mounted on the swinging fore end abuts against a limit block 46*d* (see FIG. 13(B)) fixed to the push cover 46 to limit the swinging movement of the operation plate 56. With this construction, when the push cover 46 is set to the open position during the operation of accumulating and stacking bank notes, as described above, the operation plate 56 is set to the open position together with the push cover 46, whereby the top opening of the box 5 is substantially fully opened to make it possible to effect the operation of accumulating and stacking the bank notes (see FIG. 7).

Formed between the box interior side plate 47A and the box interior side plate 47B is a container chamber 5A in which bank notes are accumulated and stacked. A pressing plate 58 for pressing the stacked bank notes onto the aforementioned operation plate 56 is movably disposed in the container chamber 5A. The pressing plate 58 is secured to a pressing carriage 58*a* (see FIG. 11) having ends protruding outside of both the box interior side plates 47A and 47B through the slots formed in the side plates 47A and 47B. The protruding ends of the pressing carriage 58*a* are guided by slide bars 59A and 59B to be moved in the axial direction of the bars, and the pressing carriage 58*a* is normally biased toward the operation plate 56 by means of springs 58*b*. The pressing plate 58 is applied with a cushion member 58*c* made of a rubber or like material, and fitted with an operation piece 58*d* for operating a full sensor operation plate 67 which will be described in detail hereinafter.

The side (as shown at the lowermost position in FIGS. 10 and 11) of the container chamber 5A is formed by an alignment plate 60 extending between the box interior side plates 47A and 47B and having one end close to the front cover 45 provided with a plurality (four in the illustrated embodiment) of notches as shown in FIG. 6. The central two notches receive separator leaf springs 61 which serve to prevent two or more bank notes from being sucked and pulled out by the suction drums 16 at one time during the operation of sucking and separating the bank notes, whereas the outboard two notches receive stoppers 62 for holding the edge portions at the side of the alignment plate 60 of the accumulated and stacked bank notes, the stoppers 62 being pivoted to the retracted positions as shown in FIG. 3 during the operation of sucking and separating the bank notes one by one. When the front cover 45 is closed as shown in FIG. 10, the stoppers 62 are locked since the fore ends thereof are engaged by the inside face of the front cover 45. Therefore, the stoppers 62 act as the positioning means when bank notes are charged into the box 5.

The side (as shown at the uppermost position in FIGS. 10 and 11) of the container chamber 5A is covered by a side cover 63 pivotally supported to open or close the main body 1 of the box 5 by hinge 53 about which push cover 46 is pivoted, and a plurality of bank note edge guides 64 for restraining the side edges of the stacked bank notes is mounted on the inside face of the side cover 63, as shown in FIGS. 10 and 11. A handle 65 for carrying the box by hand is disposed at the center of the outside face of the side cover 63, and a lock (not shown) for locking the side cover 63 in the closed position is provided at the end (the left-hand end in FIG. 10) of the side cover 63, the end being swung to open the box 5 when the lock is released.

A plurality of bank note edge guides 66 are disposed on the sides (the inside faces of the box interior side plates 47A and 47B) of the container chamber 54 for restraining the side edges of the stacked bank notes.

Now referring to FIG. 12A, the mechanism for locking and unlocking the front cover 45 will be described. A swing lug 68 provided with a pin 68*a* is mounted on the stub 49A on which the side plate portion of the front cover 45 is mounted. A lock member 69 for engaging with the pin 68*a* to control the swinging movement of the swing lug 68 is biased by a spring 69*a* to engage with the pin 68*a*. A first unlock lever 70 extends along the side of the box 5 to the bottom (the right-hand side as viewed in FIG. 12(A)) of the box 5 for swinging the lock member 69 against the biasing action of the spring 69*a* in the direction for disengaging the lock member 69 from the pin 68*a*, and has a pin 70*a* at an intermediate portion thereof. In order to prevent the front cover 45 from being accidentally opened by an erroneous operation of the first unlock lever 70, a lock lever 71 for limiting the movement of the first unlock lever 70 engages normally with the pin 70*a* while being biased by a spring 71*a* to be held at the position at which it engages with the pin 70*a*. A pin 71*b* is mounted at the aft end (left side end when viewed in FIG. 12A) of the lock lever 71. A second unlock lever 72 extends along the side cover 63 of the box 5 for moving the lock lever 71 against the action of the spring 71*a* in the direction for disengaging the lock lever 71 from the pin 70*a*. The second unlock lever 72 is biased by a spring 72*a* in the direction not to engage with the pin 71*b* of the lock level 71 (i.e. towards the bottom of the box 5) under normal conditions.

With the aforementioned construction, the lock member 69 for limiting the swinging opening of the front cover 45 by engaging with the swing lug 68 is not released until the first unlock lever 70 is operated, while the second unlock lever 72 engages with the pin 71*b* to move the lock lever 71.

Figure 17A:
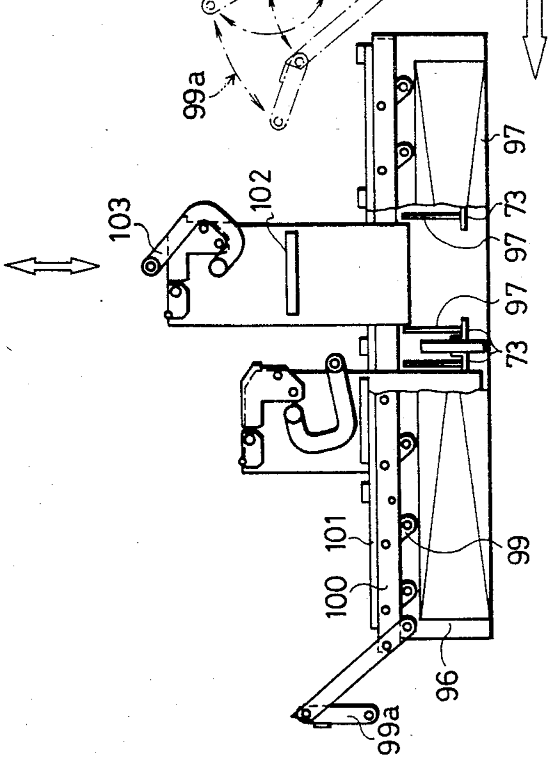
Figure 18C:
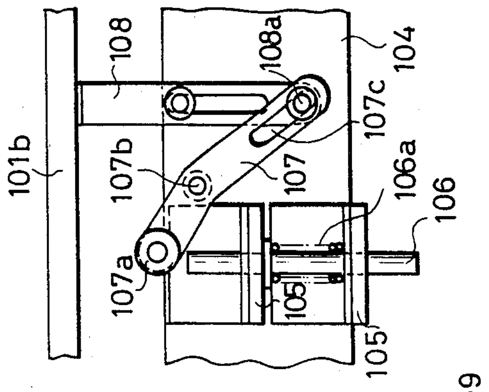
FIGS. 18(C) and 18(D) are views, respectively, viewed along the directions shown by the arrows (C) and (D) in FIGS. 18(A) and 18(B).
Figure 18A:
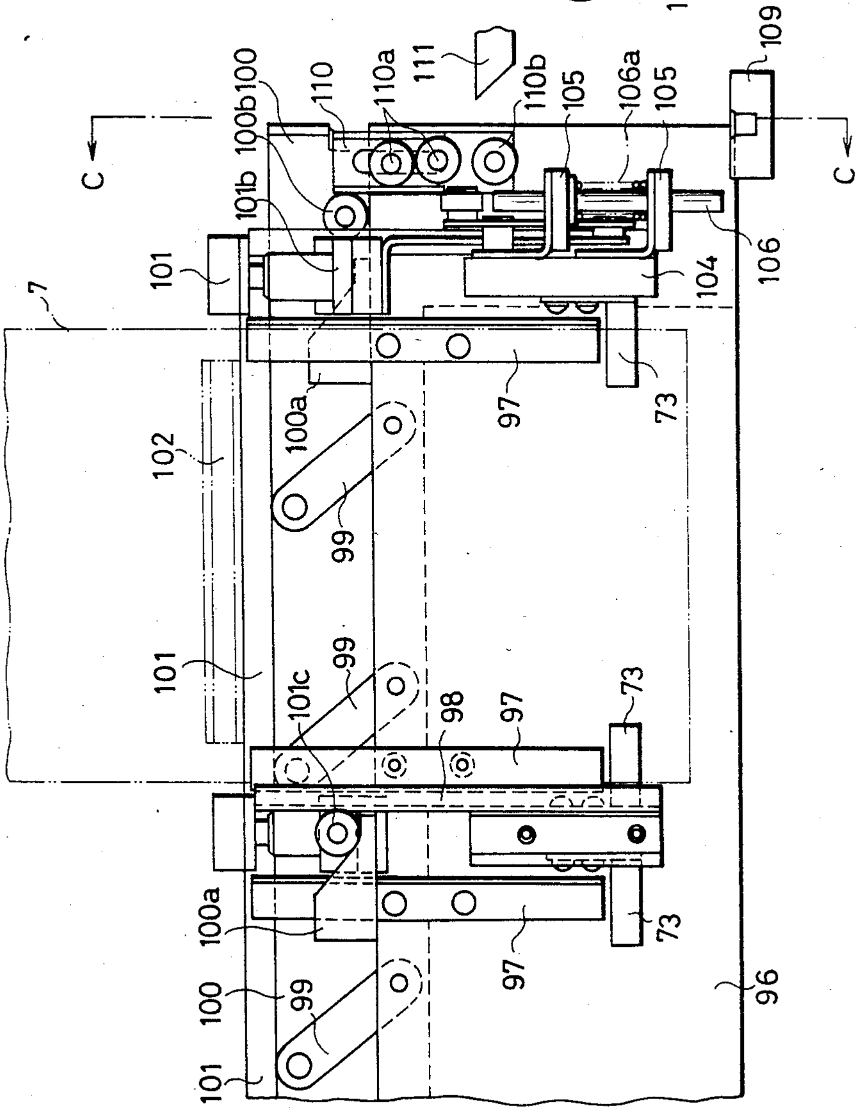
FIGS. 18(A) and 18(B) are schematic illustrations showing, respectively, the upper stage setting control mechanism and the movement limiting mechanism of the stacker supporting device.
Figure 18D:
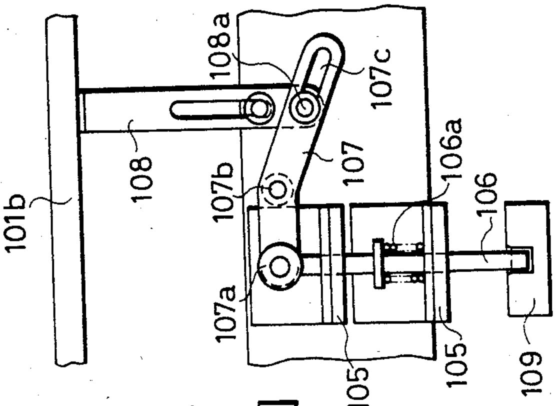
Figure 18B:
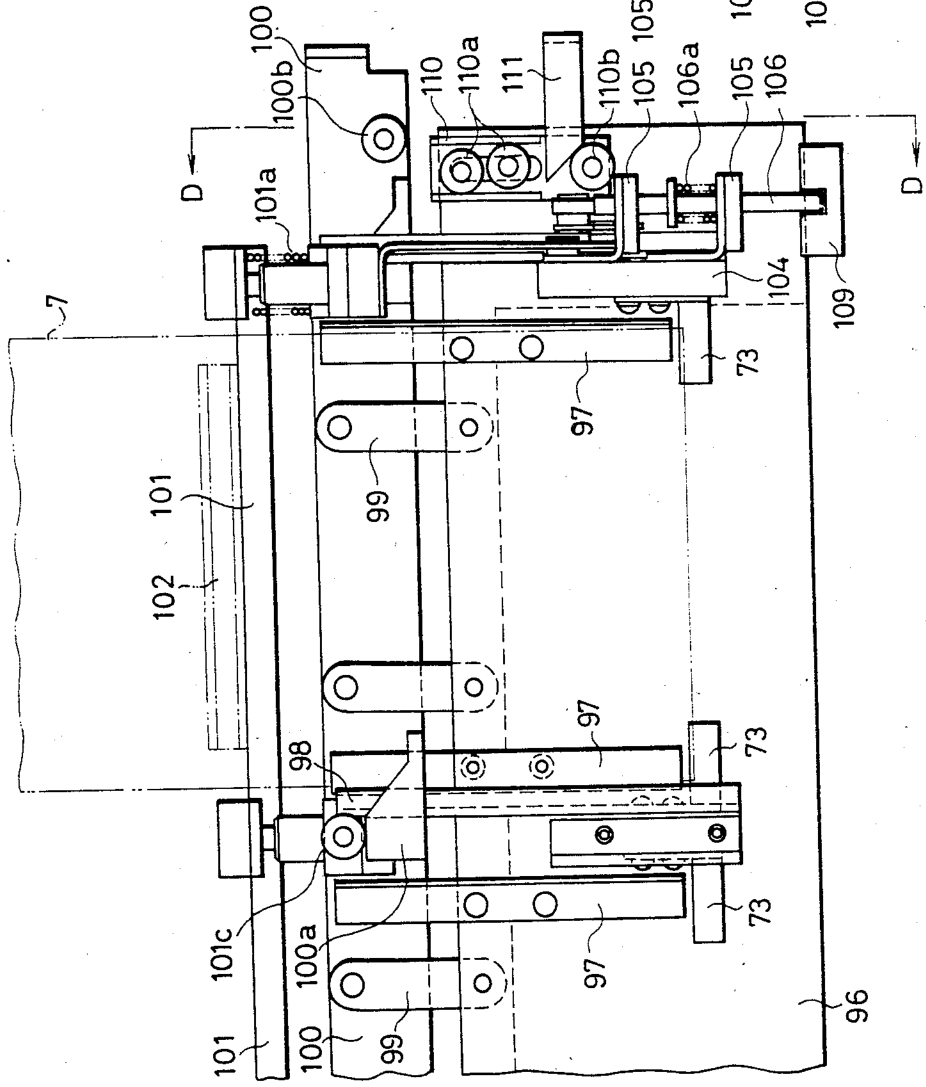

Meanwhile, the second unlock lever 72 is moved by an unlock member 73 (see FIGS. 17(A) and 18(B)) mounted to a stacker support arrangement which will be described hereinafter. On the other hand, as has been described before, the first unlock lever 70 is operated by the unlock cam (see FIG. 9(A)) provided at the lower portion of the inside end of the machine body 1 when the box 5 is inseted into or removed from the machine body 1.

The mechanism for locking and unlocking the push cover 46 will be described. A stopper hook 46*e* is fixed to the push cover 46, and a lock member 74 having a lock pin 74*a* is secured to the box interior side plate 47A to engage with the stopper hook 46*e* to lock the push cover 46 in the closed position. The lock member 74 is normally biased by a spring (not shown) in the direction for locking the push cover in the closed position. The lock member 74 has an unlock pin 74*b* fixedly secured thereto, and the unlock pin 74*b* is adapted to be moved in the direction for disengaging the engagement between the stopper hook 46*b* and the lock pin 74*a* by the action of an unlock member 75 mounted on the frame interior side plate 19A. The details of the unlock member 75 will be described hereinafter.

The mechanism for moving and setting the pressing plate 58 will be described. As has been described before, the pressing plate 58 (see FIGS. 10 and 11) is secured to the pressing carriage 58*a* which is movably guided by slide bars 59A and 59B. A chain 76 (see FIGS. 12A and 12F) extends along the slide bar 59A and one end of the pressing carriage 58*a* is connected to this chain 76 which is stretched around a sprocket 77*a* fixed to one end of shaft 77. Secured at the center of the shaft 77 is a bevel gear 77*b* which meshes with a bevel gear 78*a* mounted on the shaft 78. The shaft 78 is operatively associated with a shaft 79 through gears 78*b* and 79*a*, and also operatively associated with a link shaft 80 through gears 79*b* and 80*a*. A joint 80*b* is fixed to the end of the link shaft 80 and is positioned close to the front cover 45 in order to be connected to a driving shaft 81 which is the output shaft of a pulse drive type motor (generally referred to as stepping motor or pulse motor) SM (see FIG. 8) which will be described in detail hereinafter. The other end of the link shaft 80 has a fitting 80*c* which may be engaged with a link shaft lock release plate 82. The details of the link shaft lock release plate 82 will be described hereinafter. The link shaft 80 is slidably supported by support blocks 83 to slide in the axial direction, and has a lock pin 80*d* fixed thereto. One of the support blocks 83 is formed with a lock recess 83*a* in which the lock pin 80*d* is received. The link shaft 80 is biased by a spring 80*e* towards the front cover 45 so that the lock pin 80*d* is received in the lock recess 83*a*.

Accordingly, when the box is removed from the machine body 1, the lock pin 80*d* is received in the lock recess 83*a* under the action of the spring 80*e* to limit the rotational movement of the link shaft 80, so that the shafts 77, 78 and 79 associated with the link shaft 80 are locked and the pressing plate carriage 58*a* connected to the chain 76 is prevented from moving. When the box 5 is moved upwards by one step to the position shown by the dot-and-dash lines in FIG. 9(A) and the joint 80*b* of the link shaft 80 engages with the driving shaft 81 of the motor SM (details will be described hereinafter) mounted on the frame interior side plate 19A, the lock pin 80*d* is disengaged from the lock recess 83*a* to allow the link shaft 80 to be rotated by the motor SM, whereby the pressing plate 58 is set to be moved close to or remote from the front cover 45 upon rotation of the motor SM in the positive or reverse direction.

Figures 12A, 12B, 12C, 12D, 12E:
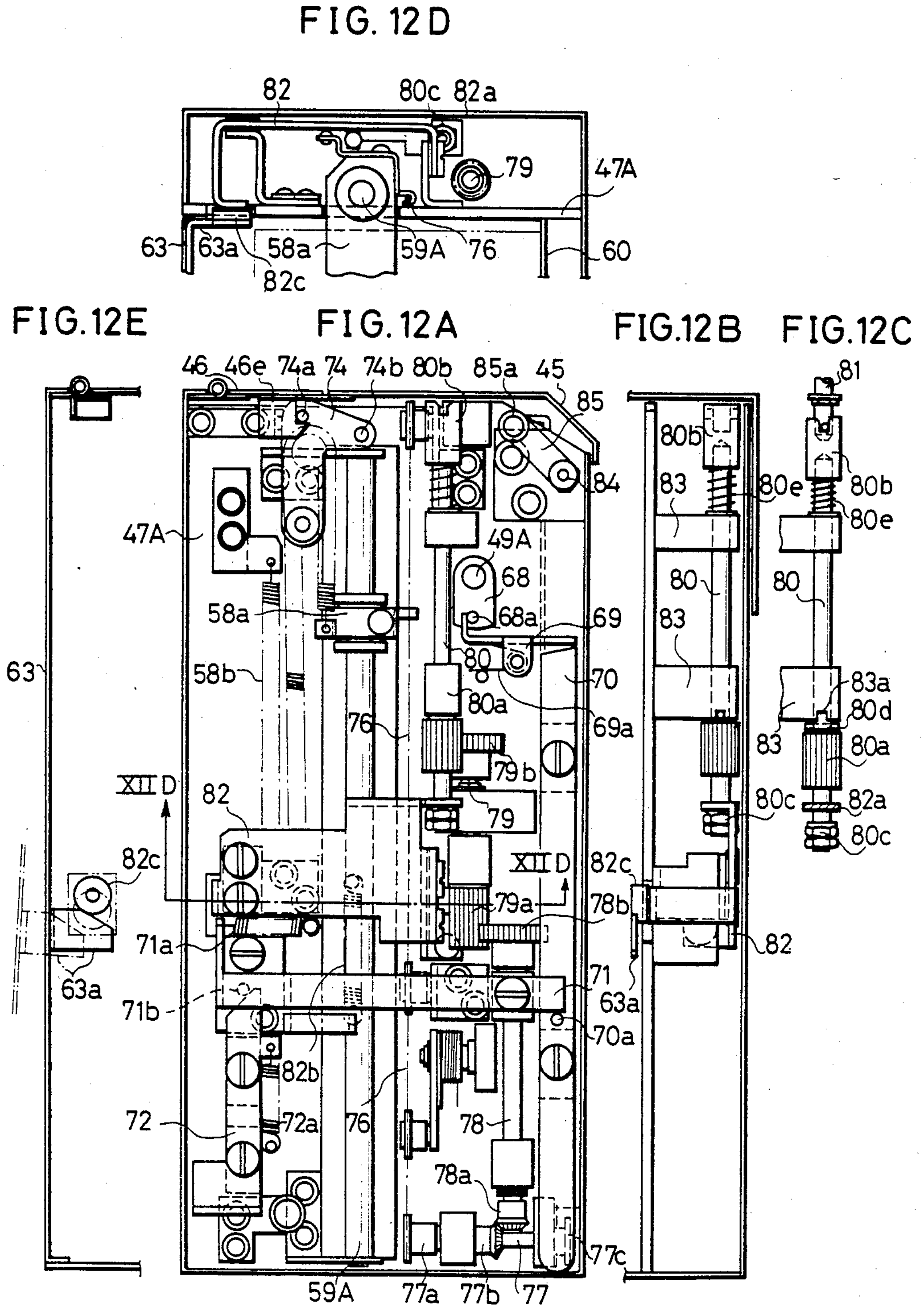
FIGS. 12(A) to 12(F) and 13(A) to 13(D) are schematic illustrations showing the structure and operation of the parts mounted to the interior side plates of each note box, FIG. 12A based upon looking in the direction of arrows XII—XII of FIG. 11 and FIG. 13A based upon looking in the direction of arrows XIII—XIII of FIG. 11.
Figure 12F:
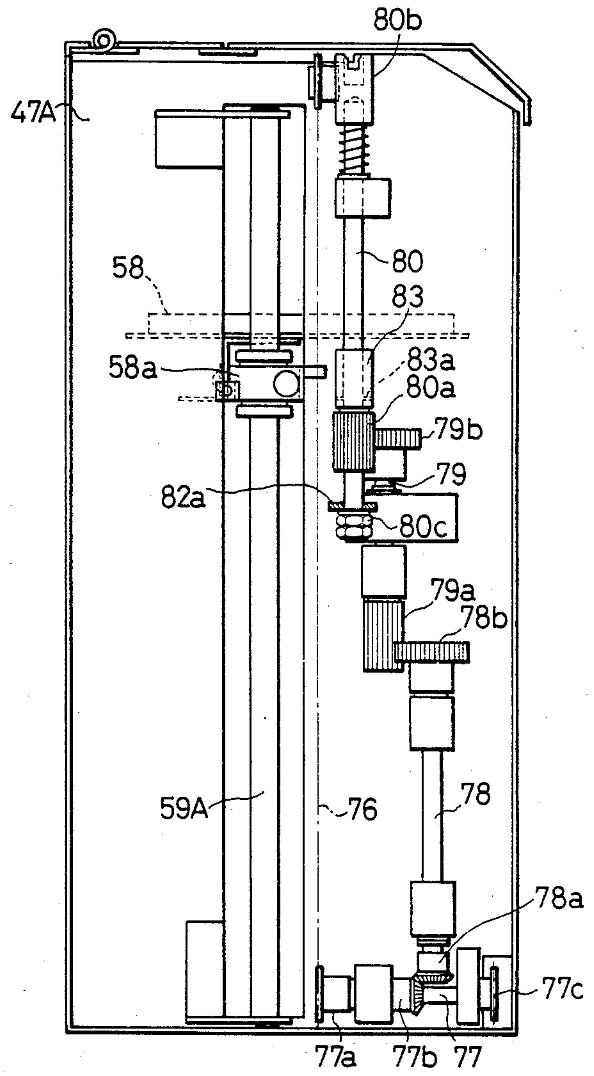

As shown in FIG. 12(C), even if the end of the driving shaft 81 is imperfectly inserted in the joint 80*b* of the link shaft 80 at the initial stage, the joint operation is completed under the action of the spring 80*e* as the link shaft 80 rotates.

As will be seen from the foregoing, the link shaft lock mechanism provided on the link shaft 80 comprises the lock pin 80*d*, the spring 80*e* and the lock recess 83*a* formed in one of the support blocks 83.

On the other hand, when the box 5 is removed from the machine body 1 and the side cover 63 (see FIG. 12E) is opened to charge or discharge bank notes, the pressing plate 58 must be set to be movable. For this purpose, another unlock mechanism for releasing the action of the aforementioned link shaft lock mechanism for the side cover open mode is provided, which operates when the side cover 63 is opened. In detail, the link shaft lock release plate 82 is supported to be slidably moved in a direction coaxial with the sliding direction of the link shaft 80, and has at its end a rising edge 82*a* through which the end of the link shaft 80 is inserted and stopped by the fitting 80*c*. The link shaft lock release plate 82 is biased by a spring 82*b* in the direction to be separated from the link shaft 80, with the biasing force of the spring 82*b* being stronger than the biasing force by the spring 80*e* attached to the other end of the link shaft 80. A roller 82*c* is mounted at the other end of the link shaft lock release plate 82 on the side facing to the side cover 63, and projects through a hole formed in the box interior side plate 47A so that the free end of the roller 82*c* projects inside of the container chamber 5A within the box 5. On the other hand, at the lower portion of the wall of the side cover 63 is a fixed limit piece 63*a* for engaging with the free end of the roller 82*c* to move the link shaft lock release plate 82 toward the link shaft 80.

With the aforementioned construction, the link shaft lock release plate 82 is freed from the limit piece 63*a* to slide in the direction for separating from the front cover 45 by the action of the spring 82*b*, when the side cover 63 is opened to charge or discharge bank notes. At that point, the rising edge 82*a* engages with the fitting 80*c* fixed to the end of the link shaft 80 to move the link shaft 80 against the action of the spring 80*e*, since the spring force of the spring 82*b* is stronger than that of the spring 80*e*. As a result, the lock pin 80*d* is disengaged from the lock recess 83*a* to make it possible to freely move the pressing plate 58 by the operator's hand.

The aforementioned stoppers 62 are mounted on a shaft 84 which is rotatably carried by the side end of the front cover 45, and a stopper arm 85 for swinging the stoppers 62 is mounted on the shaft 84. Supported on the swinging fore end of the stopper arm 85 is a roller 85*a* which engages with an operation arm 86. The details of the operation arm 86 will be described hereinafter. The shaft 84 is provided with a spring 84*a* for biasing the shaft 84 to rotate in the direction so that the stoppers 62 engage with the edges of the stacked bank notes (see FIG. 6).

A further explanation will be given with reference to FIG. 13A. The box interior side plate 47B is also provided with another mechanism for locking and uncloking the front cover. The mechanism mounted on the side plate 47B is of the same structure as the mechanism mounted on the box interior side plate 47A, to prevent the front cover from being opened accidentally. In the accompanying drawings, the parts exerting the same functions are depicted by the same reference numerals, and explanations of such parts will be abridged in the following description.

At the position adjacent to the front cover 45, there is disposed an upper sensor operation plate 57 having a fore end to be moved closer to the front cover 45 by means of a pivotal operation pin 56*b* to operate an upper surface sensor 87 which will be described in detail hereinafter.

A switch operation plate 88 is secured adjacent to the upper sensor operation plate 57 to operate a box sensor switch 89 which will be described in detail hereinafter.

Figure 13B:
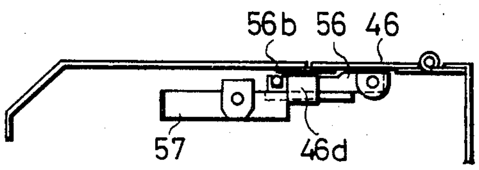
Figure 13D:
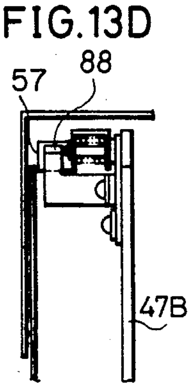
Figure 13C:
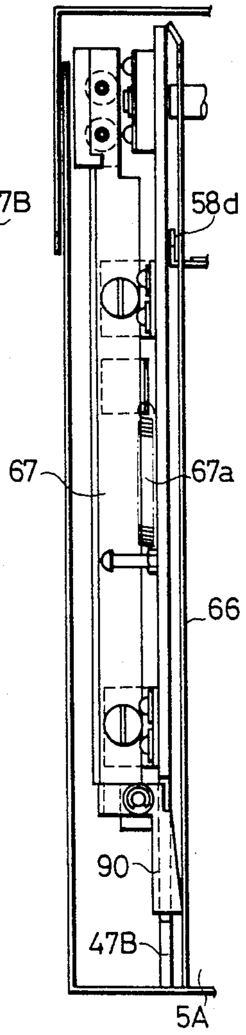
Figure 13A:
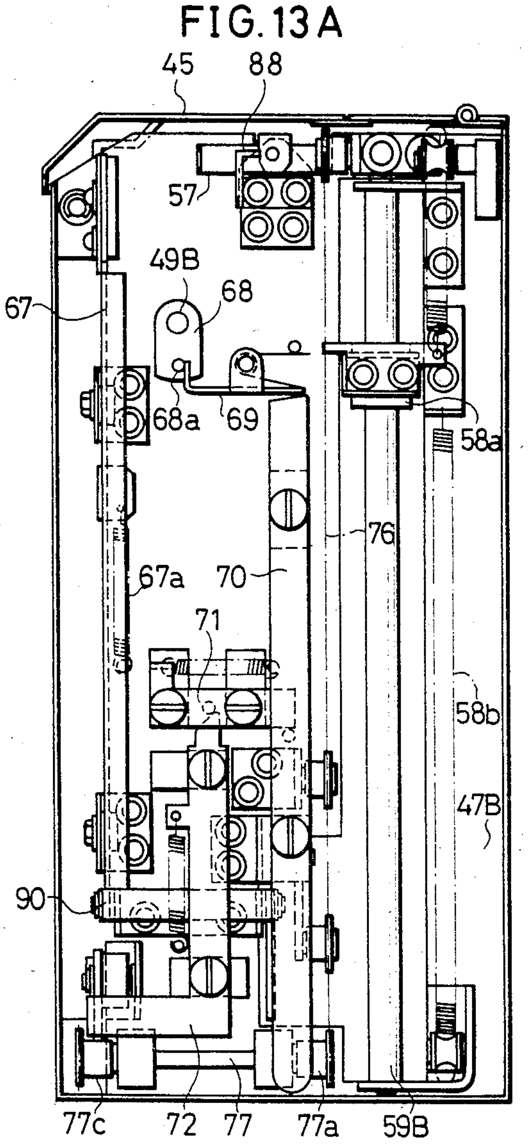

As shown in FIG. 13(C), an operation piece 58*d* secured to the movable pressing plate 58 extends between the box interior side plate 47B and the bank note edge guide 66, and abuts against the full sensor lever 90 projecting through a slit formed on the box interior side plate 47B into the container chamber 5A to swing the lever 90. The full sensor lever 90 engages with a full sensor operation plate 67 which is slidably biased by a spring 67*a* in the engaging direction. When the full sensor lever 90 is swung, the fore end (the left-hand end as viewed in FIG. 13(C)) of the full sensor operation plate 67 operates a full sensor 91 which will be described in detail hereinafter. The full sensor 91 is positioned to operate at the time when the box 5 is filled with bank notes at its full operating capacity.

Different from the mechanism mounted on the box interior side plate 47A (shown in FIG. 12), the link shaft for directly driving the chain 76 is omitted from the mechanism mounted on the box interior side plate 47B, and the chain 76 is driven by another chain (not shown) stretched over sprockets 77*c*, 77*c* mounted on respective shafts 77, 77, the chains extending along both box interior side plates 47A and 47B to be driven in synchronism with each other.

The driving mechanism for driving the aforementioned various mechanisms in the box 5 will now be described.

Firstly, the operation of the push cover opening mechanism will be described. The push cover 46 (see FIG. 3) is locked to the closed position during the operation of sucking and separating the bank notes (at this time, the accumulating wheel 13 is moved to the upper retracted position), and is held at the open position during the operation of accumulating and stacking the bank notes (at this time, the accumulating wheel is moved to the lower accumulating position). In view of the necessary operations, opening and closing operations of the push cover 46 are operatively associated with the swinging operations of the accumulating wheel 13. Particularly referring to FIG. 8, the pin **34*b* fixed to the swinging end of the swing lug 34 carries one end of a link bar 39 and one end of a co-operation bar 92. The other end of the co-operation bar 92 is carried by a pin 93*b* supported at the upper end of an opening arm 93 swingably carried by a shaft 93*a*. The swinging lower end of the opening arm 93 carries a roller 93*c* for operating the unlock member 75 mounted to release the lock of the aforementioned push cover lock mechanism, and is also formed with a cam face 93*d* for guiding the push cover 46 to the open position (shown by the dot-and-dash line in FIG. 8) when the lock mechanism is unlocked, and for returning the push cover 46 again to the closed position. The cam face 93*d* engages with the guide rollers 54 carried by the side plate portions 46*a* and 46*b* of the push cover 46. The unlock member 75 is swingably carried by the frame inner side plate 19A and is normally biased by a spring, not shown, in the direction towards the roller 93*c* of the opening arm 93**.

Figure 14:
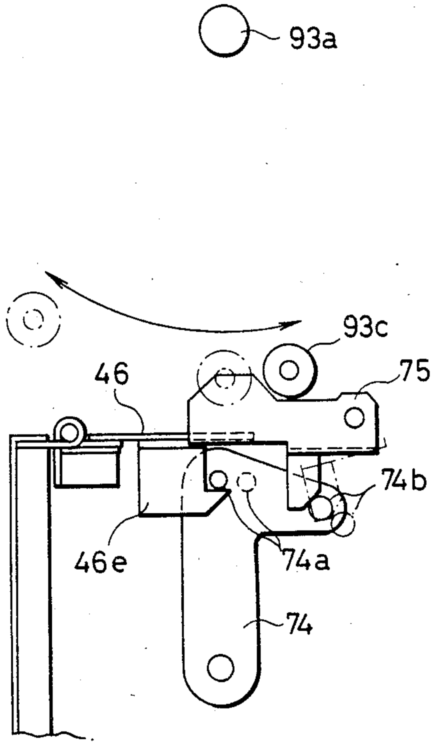
FIG. 14 is a schematic view illustrating the structure and operation of the means for locking and unlocking the push cover.

With the construction as forementioned, as the opening arm starts to swing towards the position shown by the dot-and-dash line in FIG. 8, the roller **93*c* swings the unlock member 75 downward as shown in FIG. 14, and the unlock member 75 engages with the unlock pin 74*b* of the lock member 74 for locking the push cover 46 to swing the lock member 74 to disengage the stopper hook 46*e* from the lock pin 74*a*. As the opening arm swings further, the guide roller 54 of the push cover 46 moves along the cam face 93*d* of the opening arm 93 to the dot-and-dash line in FIG. 8. In the operation of closing the push cover 46**, the aforementioned operations are carried out in the reverse sequence.

The mechanism for operating the stoppers 62 will now be described. A stopper arm 85 integral with the stopper 62 has a roller **85*a* carried at the fore end thereof, and is operated by an operation arm 86 swingably carried by a shaft 86*a* mounted to the frame inner side plate 19A. The operation arm 86 is biased by a spring, not shown, to swing in the direction for separating from the roller 85*a*, and is connected to a plunger 94*b* of a solenoid 94 by a pin 94*a* positioned substantially at the center of the arm 86**.

The stoppers 62 are thus opened only during the operation of sucking and separating the bank notes, by energizing the solenoid 94 to swing each stopper 62 to the retracted position shown in FIG. 3 just before the commencement of the counting operation, and by deenergizing the solenoid immediately after the completion of the counting operation to restore the stoppers to the normal closed positions to obviate erroneous overcounting. As has been described hereinbefore, the stoppers 62 serve as the guides for the scraping operation when the bank notes are accumulated and stacked.

The aforementioned motor SM is mounted on the frame inner side plate 19A, and has its output shaft, namely the driving shaft 81, extending downwards when viewed in FIG. 8.

Figure 15A:
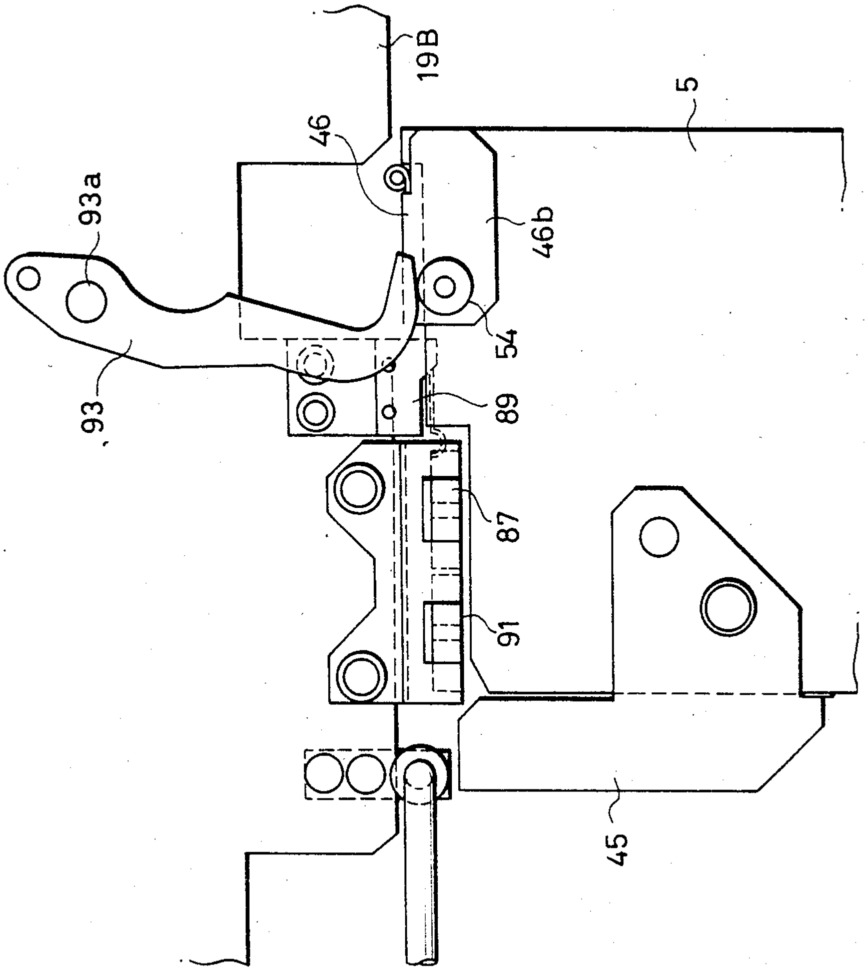
FIGS. 15(A) and 15(B) are schematic views showing the arrangement of the upper surface sensor and related parts.
Figure 15B:
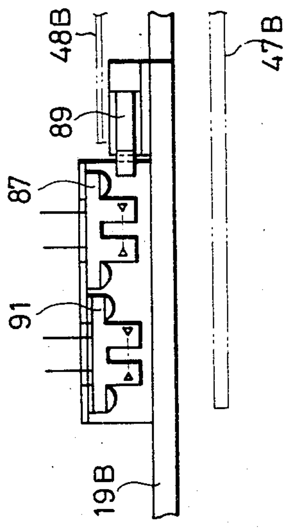

Now referring to FIGS. 15(A) and 15(B), there is shown an opening arm 93 for opening and closing the push cover 46 mounted on the frame inner side plate 19B to engage with another guide roller 54 mounted on the side plate portion **46*b* of the push cover 46**.

The full sensor 91 is disposed at the lower end portion of the frame inner side plate 19B, and the upper sensor 87 and the box sensor switch 89 are disposed adjacent to the box 5, as described before.

As has been described hereinbefore, the full sensor 91 is operated by the full sensor operation plate 67 disposed in the box 5 when the volume of the accumulated and stacked bank notes reaches to the full capacity. On the other hand, the box sensor switch 89 is put on by the switch sensor operation plate 88 disposed in the box 5 when the box 5 is inserted into the machine body 1 of the automatic money depositing and disbursing machine.

Figure 16B:
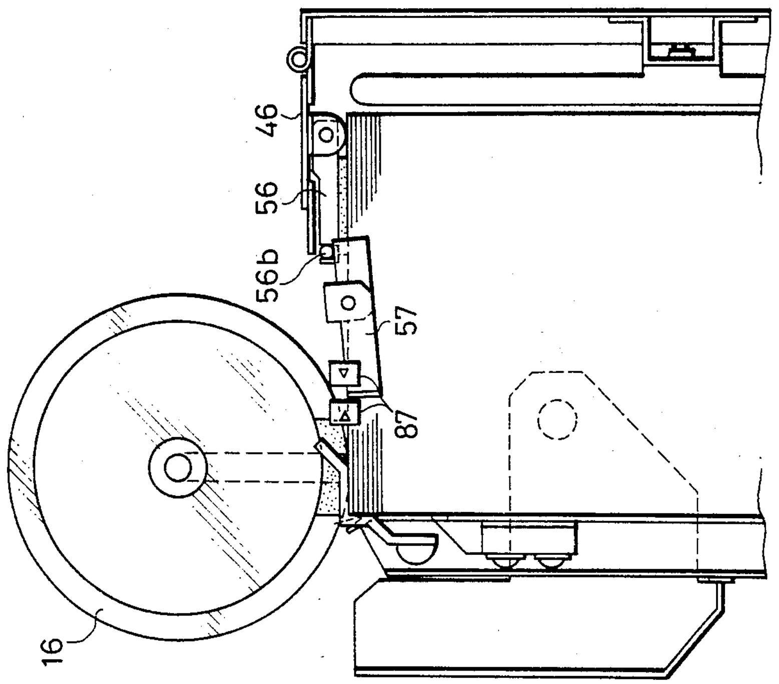
FIGS. 16(A) and 16(B) are schematic illustrations showing the interrelation, in operation, between the accumulated bank note stack and the upper sensor.
Figure 16A:
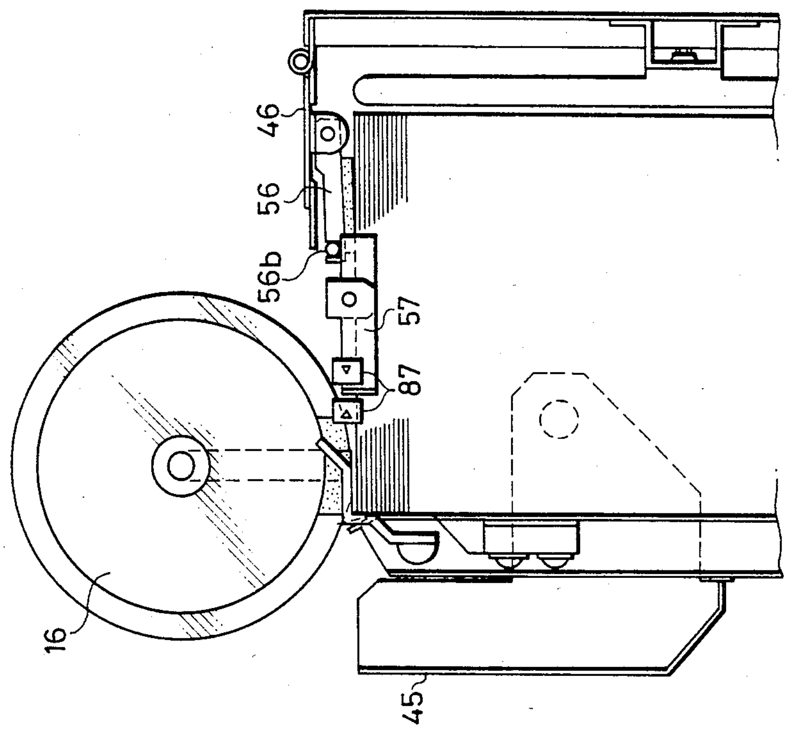

The upper surface sensor 87 is provided for sensing the upper surface of the stacked bank notes accumulated in the box 5 to determine whether the upper surface is set to the position ready for being sucked by the suction drums 16 or not. When the upper surface is set to the position for from the suction drums 16, as shown in FIG. 16(A), the operation plate 56 of the push cover 46 is swung downwards, and the operation pin **56*b* mounted at the swinging end of the operation plate 56 swings the fore end of the upper surface sensor operation plate 57 upwards to operate the upper surface sensor 87. Under such a condition where the upper surface of the bank note stack has not yet been set to the operable position, the motor SM is energized by a signal generated from the upper surface sensor 87 to move the pressing plate upwards. As the upper surface of the bank note stack reaches the operable position to be engaged by the suction drums 16, the operation plate 56 of the push cover 46 swings upwards and the operation pin 56*b* mounted at the swinging end of the operation plate 56 swings the fore end of the upper surface sensor operation plate 57 downwards to cease operation of the upper surface sensor 87**. The positioning operation for setting the upper surface to the operable position is completed at the time when operation of the upper surface sensor ceases, and the motor SM is stopped at that time.

As the operation of sucking and separating the bank notes proceeds, the motor SM is energized in response to the operation of the upper surface sensor 87 to set the upper surface of the bank note stack to the operable position.

Now referring to FIGS. 17 and 18, the stacker supporting device will be described. The stacker supporting device carries all of the boxes 4 to 7 for inserting them into the machine body 1 and for removing them from the machine body 1 simultaneously.

Slide rails 95 extend horizontally at the lower portion of the machine body 1, and a movable frame 96 is slidably guided by the slide rails 95 to be contained in the machine body 1 or to be pulled out of the machine body 1 by pulling it in the horizontal direction. The movable frame 96 has a number of box guide members 97 for guiding respective boxes 4 to 7 to position them precisely when the frame 96 is inserted within the machine body 1, and also has a plurality of release members 73 for operating corresponding second unlock levers 72 of the mechanisms for locking and unlocking the front covers 45 arranged in respective boxes 4 to 7. Adjacent to some box guides 97 are disposed roller guides 98 which are supported to extend upwards in the vertical direction.

A number of arms 99 are mounted on the upper portion of the outside face of the movable frame 96 having their lower ends rotatably secured to the frame and having their swinging upper ends linked to an upward-swinging frame 100 to form a so-called parallel link structure so that the upward-swinging frame 100 may be moved to the upper set position by the swinging actions of these arms 99. A plurality of cam members 100*a* is secured on the inside face of the upward-swinging frame 100, and the arm 99 positioned at the end of the pulling side is combined with suitable fitting members to serve as a handle 99*a*.

A box support frame 101 positioned and supported by the roller guides 98 and the cam members 100*a* is disposed above the upward-swinging frame 100 to be moved upwards and downwards. The box support frame 101 is supported by a support bar 101*b* resiliently supported by a spring 101*a*, and the support bar 101*b* has at one end a roller 101*c* which is positioned and supported by the roller guides 98 and the cam members 100*a*. (see FIG. 18(A))

Figure 17B:
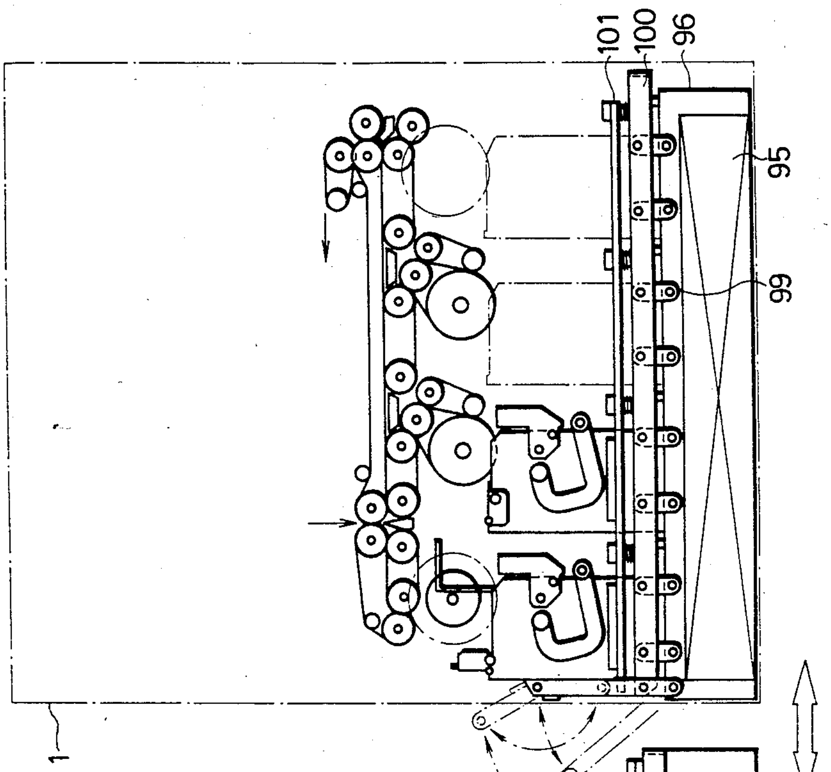
FIGS. 17(A) and 17(B) are diagrammatical views showing the structure of a stacker supporting device.

When the handle 99*a* is grasped and swung to the position shown by the dot-and-dash line in FIG. 17(B), the upward-swinging frame 100 is moved upwards and concurrently moved inwardly (to the right-hand direction in the Figure) of the machine body 1. Whereupon, the cam members 100*a* mounted on the inside face of the upward-swinging frame 100 are moved close to the roller guides 98, so that the rollers 101*c* (although not shown in the Figure, two rollers are superimposed and the roller guides 98 and the cam member engage the corresponding rollers individually) supported by the support bar 101*b* are moved upwards while being guided by the cam members 100*a* and being prevented from moving in the horizontal direction by the roller guides 98, whereby respective boxes 4 to 7 are set to the upper operable positions through the box support frame 101 (see FIG. 18(B)). Horizontally extending bands 102 are fixed on the outside faces of the box exterior side plates 48A and 48B of each of the boxes 4 to 7, and the box support frame 101 engages with these bands 102 to support each box. Handles 103 are provided for handling respective boxes 4 to 7 to charge them or discharge them in or from the stacker support devices 102 that are mounted on the box exterior side plates.

The structure for controlling the operation of moving the stacker support frame in the upward and downward directions and for controlling the operation of pushing in and pulling out the stacker support frame will be described. All of the boxes 4 to 7 are prevented from moving to the upper operable positions until the movable frame 96 is inserted and then moved to the pre-set position in the machine body 1, and the movable frame 96 is prevented from moving in the pullout direction when the boxes 4 to 7 are held at the upper operable positions, whereby the parts mounted to respective boxes 4 to 7 and the parts adapted to be co-operatively combined with the parts of the respective boxes and disposed in the receiving section 8. The first and second accumulating and separating feed sections 9 and 10 and the accumulating and receiving section 11 can thus be securely prevented from being damaged by erroneous operations.

The movable frame 96 has a front plate 104 at the fore end of the inserted side, and support blocks 105 are fixedly mounted to the front plate 104 and carry a movement limit shaft 106 which is slidably movable in the vertical direction and normally biased by a spring 106*a* to be held in the upper retracted position. A swingable lever 107 having its upper end mounted with a roller 107*a* is pivoted by an axis 107*b*. The roller 107*a* is capable of moving to the position for abutting against the upper end of the movement limit shaft 106, and an elongated slot 107*c* is formed at the lower end of the swingable lever 107. As the swingable lever 107 swings about the pivot axis 107*b*, the roller 107*b* mounted at the upper end thereof presses the upper end of the movement limit shaft 106 to move the latter downwards. On the other hand, the support bar 101*b* integral with the box support frame 101 has an operation lever 108 extending downward therefrom. A pin 108*a* fixed to the lower end of the operation lever 108 is inserted through the elongated slot 107*c* of the swingable lever 107. A positioning block 109 is fixed at the lower end of the machine body 1 to prevent the movable frame 96 from moving from the inserted position when the boxes are set to the upper operable positions.

A swinging limit plate 110 is slidably carried by a pin 110*a* at the upper position of the fore end of the inserted side of the movable frame 96, and the swinging limit plate 110 is biased by a spring, not shown, to project upwards. On the other hand, the upward-swinging frame 100 carries a roller 100*b* at the fore end of the inserted side so that the roller 100*b* engages with the side of the upper portion of the swinging limit plate 110 projecting upwards by the action of the not-shown spring. With this construction, the upward-swinging frame 100 cannot be swung upwards until the swinging limit plate 110 is moved to the lower retracted position. A limit release lug 111, diagrammatically shown in the right side of FIG. 18(A), protrudes from the interior wall of the machine body 1 to engage with the roller 110*b* of the swinging limit plate 110 when the movable frame 96 is inserted in the machine body, and is moved to the pre-set position, whereupon the swinging limit plate 110 is moved to the lower retracted position.

As should be appreciated from the foregoing description, the upward-swinging frame 100 is prevented from swinging upwards by the action of the swinging limit plate 110 until the movable frame 96 is inserted into the machine body 1 to occupy the pre-set position. On the other hand, when the upward-swinging frame 100 is set to the upper swung position, the movement limit shaft 106 is received in the positioning block 109 to prevent the movable frame 96 from moving in the horizontal direction.

Important parts and operations thereof incorporated in the automatic money depositing and disbursing machine according to this invention have been described. Various handling modes for handling the bank notes by the automatic money depositing and disbursing machine, i.e., the summary of operation of automatic money depositing and disbursing machine, the depositing treatment, the receiving treatment and the disbursing treatment, have been generally described in our U.S. patent application Ser. No. 462,985, filed Feb. 1, 1983.

The features or merits of the device according to the present invention will now be described.

Upon change-over of the automatic money depositing and disbursing machine to the money depositing mode operation, namely that the bank notes received by the machine are stacked in respective boxes 5 to 7 by the note accumulating and stacking means, the drive shaft 81 rotated by the motor SM is connected to the joint 80*b* of the link shaft 80 and simultaneously the link shaft 80 is pushed to the left as viewed in FIG. 12(B), as has been mentioned hereinbefore, so that the aforementioned link shaft lock mechanism (comprising the support block 83 having the lock recess 83*a* and the lock pin 86*b*) is released to allow the link shaft 80 to rotate. Also, in response to the change-over instructions to change the system to the money depositing mode, the motor SM rotates the link shaft 80 through the link shaft drive shaft 81 and the sprocket 77*a* is rotated through the gears 80*a*, 79*b*, 78*a* and 77*b*, so that the pressing plate 58 (See FIG. 10) operated by the chain 76 (See FIGS. 12A and 12F); is moved to the lower accumulating position against the biasing action of the spring 58*b* to be stopped at that position. Thereafter, classified bank notes of separate kinds are allowed to fall down through the upper openings of the boxes 5 to 7 to be accumulated and stacked in respective boxes.

On the other hand, during the operation of disbursing bank notes, namely when bank notes are dispensed from the boxes 5 and/or 6, the link shaft 80 is rotated in the opposite direction to that in the money depositing mode operation, so that the pressing plate 58 is moved upwards by the action of chain 76. The amount of this movement is determined in response to the detection of notes by the upper surface sensor 87, which senses the upper surface of the uppermost note accumulated and stacked in each of the boxes 5 and 6. More specifically, when the position or level of the uppermost surface of the accumulated and stacked bank notes is to be set to the position ready for being sucked by the suction drum as in FIG. 16, the operation plate 56 of the push cover 46 is swung upwards to stop the operation of upper surface sensor 87. Then, bank notes are pulled out of the box by means of the suction drums and related parts to lower the uppermost surface, and subsequently the upper surface sensor 87 is again operated to reset the position of the bank note stack by moving the pressing plate upwards.

When the boxes 5 and 6 are pulled out of the machine body 1, all of the boxes are lowered from the upper positions to the lower positions by the aforementioned stacker support mechanism. In detail, by grasping the handle 99*a* by hand and moving the same from the position shown in FIG. 17(B) to the position shown in FIG. 17(A), the box support frame 101 is lowered to separate the joint 80*b* of the link shaft 80 from the driving shaft 81 disposed at the side of the machine body 1, and the pressing plate is moved upwards while the link shaft 80 is moved inboard of the box by the action of the spring, so that the lock pin 80*b* engages with the lock recess 83*a* and the bank notes carried by the pressing plate 58 are pressed against the frictional member 56*a* of the push cover 46. Accordingly, the accumulated bank notes clamped between the pressing plate 58 and the push cover 46 are prevented from being collapsed or brought into disorder after then.

When any one of the boxes 5 to 7 is removed from the machine body 1 to be separated from the latter and the side cover of the separated box is opened, the lock release mechanism for the time of opening the side cover, as described in detail hereinbefore, is operated by the swinging movement of the side cover 63. As specifically illustrated in FIG. 12E, the limit piece 63*a* at the inner side of the wall of the side cover 63 is disengaged from the roller 82*c* of the link shaft lock release plate 82 to move to the position shown by the dot-and-dash line in FIG. 12(E). The link shaft lock release plate 82 is lowered by the biasing force of the spring 82*b* since the biasing force of the spring 82*b* is stronger than the biasing force of the spring 80*e*, whereby the rising portion 82*a* draws the fitting 80*c* to disengage the lock pin 80*b* from the lock recess 83*a* to allow the pressing plate 58 to be freely moved to a desired position by hand. As a result, the charge or discharge operation of the bank notes may be performed easily.

Moreover, the link shaft 80 is operatively connected to the driving shaft 81 to move the pressing plate 58 in the upward and downward directions by an external drive source, and the pressing plate 58 is unlocked from the locked condition by a simple operation of assembling the boxes 5 to 7 on the machine body 1. This provides the advantages that the construction and operation of the system are simplified.

What is claimed is:

1. A device for carrying bank notes stacked in a container box and adapted to be inserted in an automatic money depositing and disbursing machine, which comprises:

at least one box removably attached within the machine and having an upper opening, the box being adapted to receive the bank notes therein from the machine and to dispense the bank notes therefrom into the machine, through the upper opening, when the box is disposed within the machine, a pressing plate disposed within the box for movement toward and away from said upper opening in the box for carrying the bank notes that are stacked in the box, a link shaft having an axis, said link shaft axially and rotatably movably supported and disposed within the box and movable along its own axis and rotatable about its own axis, said link shaft operatively connected to the pressing plate so that the rotation of the link shaft causes the pressing plate to move toward and away from said upper opening, and means for locking the link shaft to prevent the link shaft from being rotated and thereby preventing the pressing plate from being moved toward and away from said upper opening.

2. A device according to claim 1 wherein said locking means comprises means for axially biasing the link shaft in one direction, a lock pin carried by and extending outwardly from the link shaft and a lock recess carried by and fixed to the interior of the box and engageable with the lock pin, whereby the lock pin and the lock recess are engaged with each other to prevent rotation of the link shaft when the link shaft is moved in said one direction by the biasing means.

3. A device according to claim 1, further comprising a link shaft lock release plate movably disposed within the box and operatively connected to the link shaft, and a box side cover adapted to be opened and closed and including a limit piece operatively connected to the lock release plate to cause the lock release plate to move axially of said link shaft, thereby causing the link shaft to move axially, whereby the link shaft is unlocked by the lock release plate when the lock release plate is moved in one direction and is locked when the lock release plate is moved in an opposite direction.

4. A device according to claim 1, further comprising drive means to provide rotational motion, and a driving shaft connected to the drive means and drivingly engageable with the link shaft to transmit a rotational driving force to the link shaft.

5. A device according to claim 4, wherein the driving shaft is axially movable to cause the link shaft to move axially to unlock the locking means and permit rotation of the link shaft.

6. A device for carrying bank notes stacked in a container box and adapted to be inserted in an automatic money depositing and disbursing machine, which comprises;

at least one box removably attached within the machine and having an upper opening, the box being adapted to receive the bank notes therein from the machine and to dispense the bank notes therefrom into the machine, through the upper opening, when the box is disposed within the machine, a pressing plate disposed within the box for movement toward and away toward and away from said upper opening in the box for carrying the bank notes that are stacked in the box, a pair of rotatable sprockets, one being disposed within the box adjacent the bottom portion thereof and the other being disposed within the box adjacent the top portion thereof, an endless chain carried by the pair of sprockets for movement therewith and connected to the pressing plate so that the pressing plate is movable with the chain, a link shaft movably and rotatably supported within the box and having a vertical axis, said link shaft being movable along its own axis between a locked upper position wherein the link shaft is locked against rotation and an operating lower position wherein the link shaft is permitted to rotate, and said link shaft is rotatable about its own axis when in the lower position, gear train means for transmitting rotational movement of said link shaft to said chain, whereby rotation of the link shaft causes the chain to move to carry the pressing plate toward and away from the upper opening, means for locking the link shaft to prevent the link shaft from being rotated and thereby preventing the pressing plate from being moved toward and away from said upper opening, said locking means including means for axially biasing the link shaft upwardly to a locked upper position, a lock pin provided on the link shaft and a lock recess fixed to the interior of the box and engageable with the lock pin, the lock pin and the lock recess being engaged with each other to prevent rotation of the link shaft when the link shaft is biased upwardly by the biasing means, and a driving shaft engageable with the link shaft to cause the link shaft to move downwardly to unlock the locking means and permit rotation of the link shaft.

7. A device according to claim 6, further comprising a link shaft lock release plate movably disposed within the box and operatively connected to the link shaft, and a box side cover adapted to be opened and closed and including a limit piece operatively connected to the lock release plate to cause the lock release plate to move axially relative to said link shaft, thereby causing the link shaft to move axially, the link shaft being unlocked by the lock release plate when the lock release plate is moved in one direction and being locked when the lock release plate is moved in an opposite direction.

8. A device according to claim 6, further comprising drive means connected to the driving shaft to transmit rotational driving force to the link shaft through the driving shaft.

* * * * *